United States Patent
Nagatomi et al.

(10) Patent No.: US 8,270,280 B2
(45) Date of Patent: Sep. 18, 2012

(54) OPTICAL PICKUP DEVICE

(75) Inventors: Kenji Nagatomi, Kaizu (JP); Seiichiro Takahashi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 171 days.

(21) Appl. No.: 12/890,777

(22) Filed: Sep. 27, 2010

(65) Prior Publication Data

US 2011/0075545 A1    Mar. 31, 2011

(30) Foreign Application Priority Data

Sep. 28, 2009    (JP) ................................ 2009-223512

(51) Int. Cl.
*G11B 7/135* (2012.01)
(52) U.S. Cl. .................. 369/112.12; 369/44.23; 369/94; 369/103; 369/112.03; 369/112.15
(58) Field of Classification Search ............... 369/44.23, 369/94, 103, 112.03, 112.12, 112.15
See application file for complete search history.

(56) References Cited

U.S. PATENT DOCUMENTS

| | | | |
|---|---|---|---|
| 6,574,174 B1* | 6/2003 | Amble et al. | 369/44.26 |
| 7,542,396 B2* | 6/2009 | Terao et al. | 369/112.01 |
| 2007/0147200 A1* | 6/2007 | Ogawa | 369/44.37 |
| 2008/0219130 A1* | 9/2008 | Salomon et al. | 369/112.03 |
| 2009/0303854 A1* | 12/2009 | Nakatani et al. | 369/94 |
| 2010/0053710 A1* | 3/2010 | Bae et al. | 359/3 |
| 2010/0061210 A1* | 3/2010 | Kim et al. | 369/94 |
| 2010/0110846 A1* | 5/2010 | Park et al. | 369/44.23 |

FOREIGN PATENT DOCUMENTS

| | | | |
|---|---|---|---|
| JP | 2008-287754 A | 11/2008 |
| JP | 2009-104717 A | 5/2009 |

* cited by examiner

*Primary Examiner* — Wayne Young
*Assistant Examiner* — Brenda Bernardi
(74) *Attorney, Agent, or Firm* — Ditthavong Mori & Steiner, P.C.

(57) ABSTRACT

An optical pickup device is provided with a spectral element which imparts diffraction in such a manner that four light fluxes of the first laser light are separated from each other, when a light flux of the first laser light and a light flux of the second laser light reflected on a recording medium having laminated recording layers and servo layers are divided into four by a first straight line in parallel to a converging direction by an astigmatism element, and a second straight line perpendicular to the first straight line, and that the four light fluxes of the first laser light propagate on an outer side than the light flux of the second laser light; and a photodetector including a first sensor group which receives the first laser light, and a second sensor group which receives the second laser light.

6 Claims, 19 Drawing Sheets

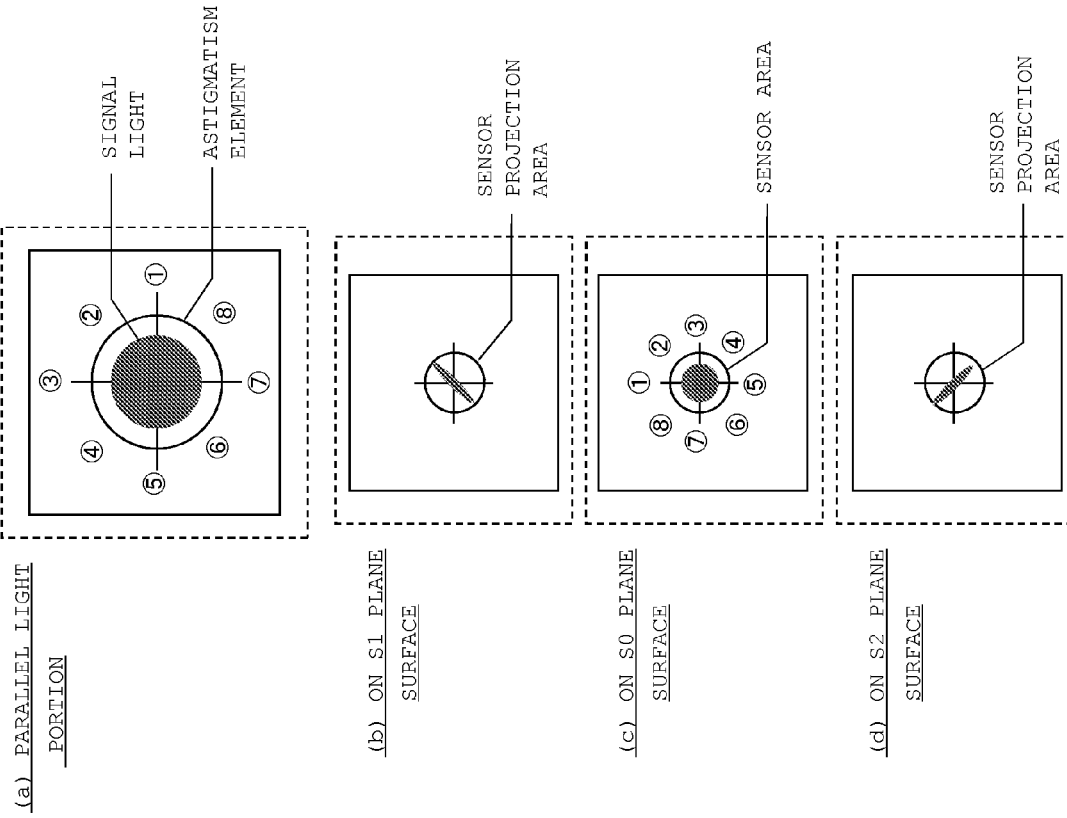
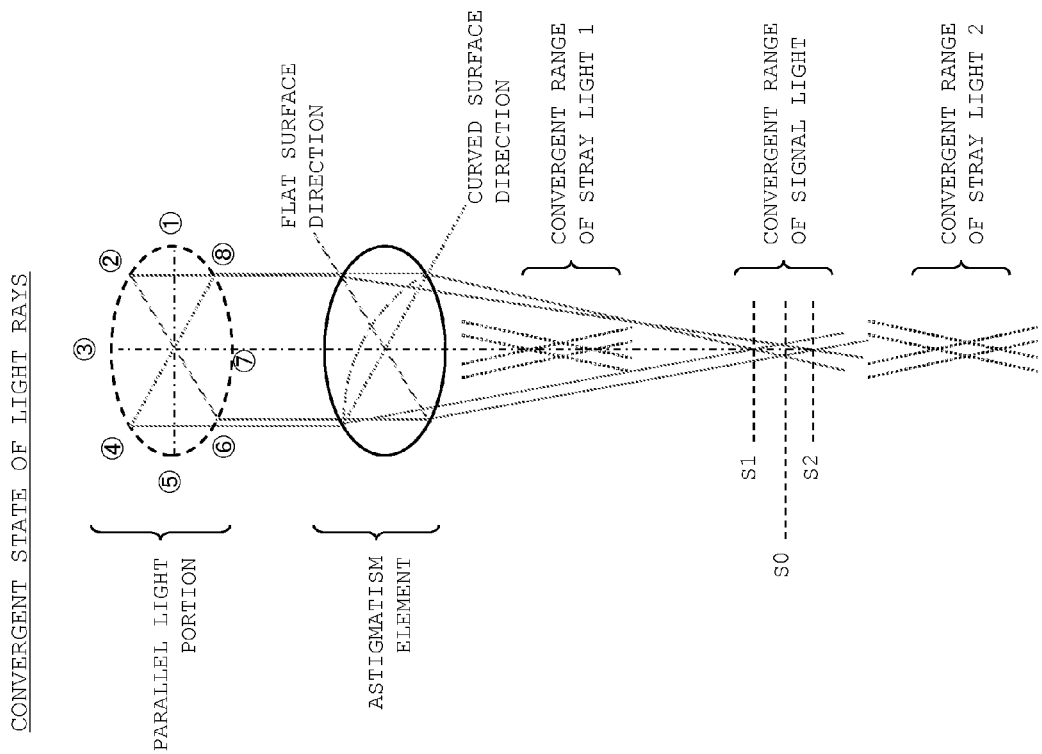

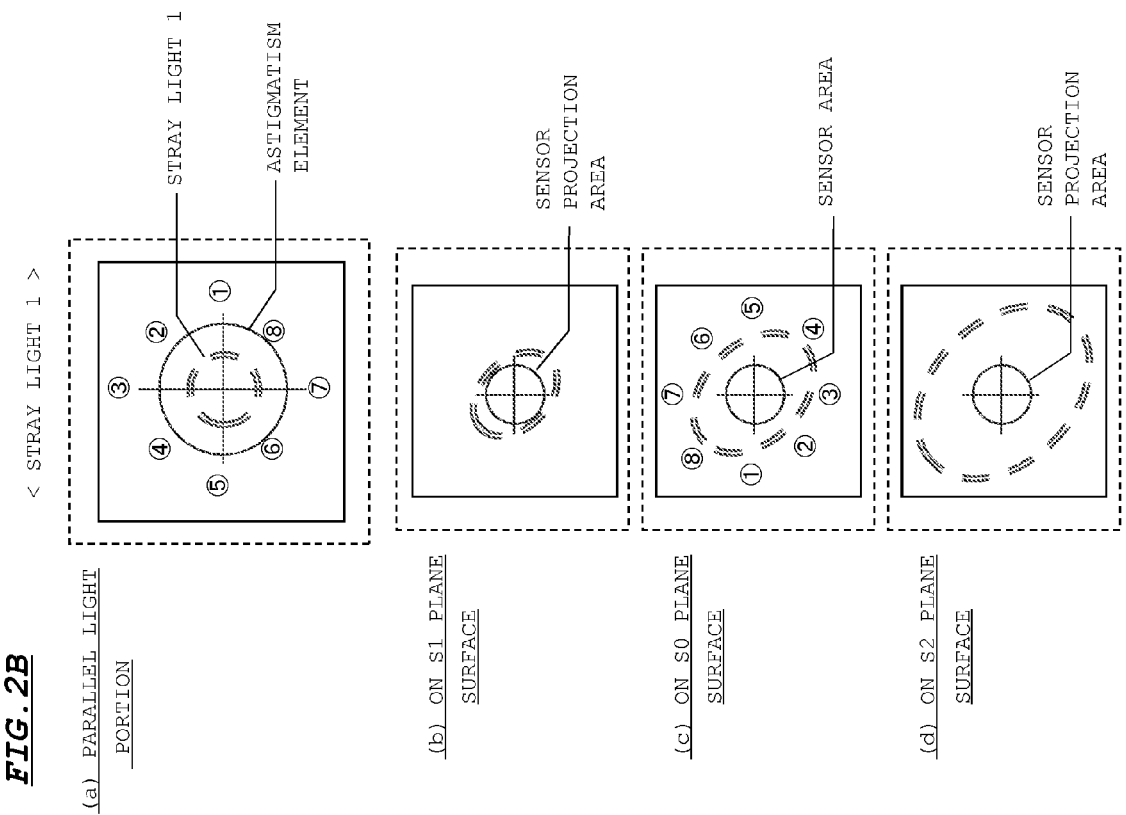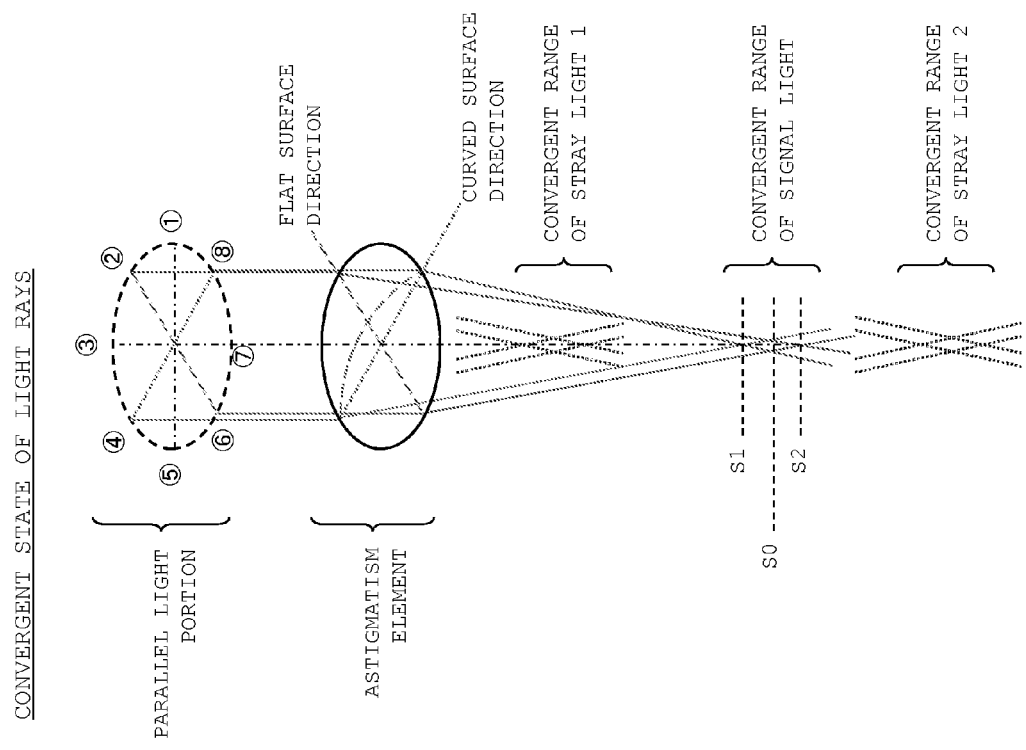

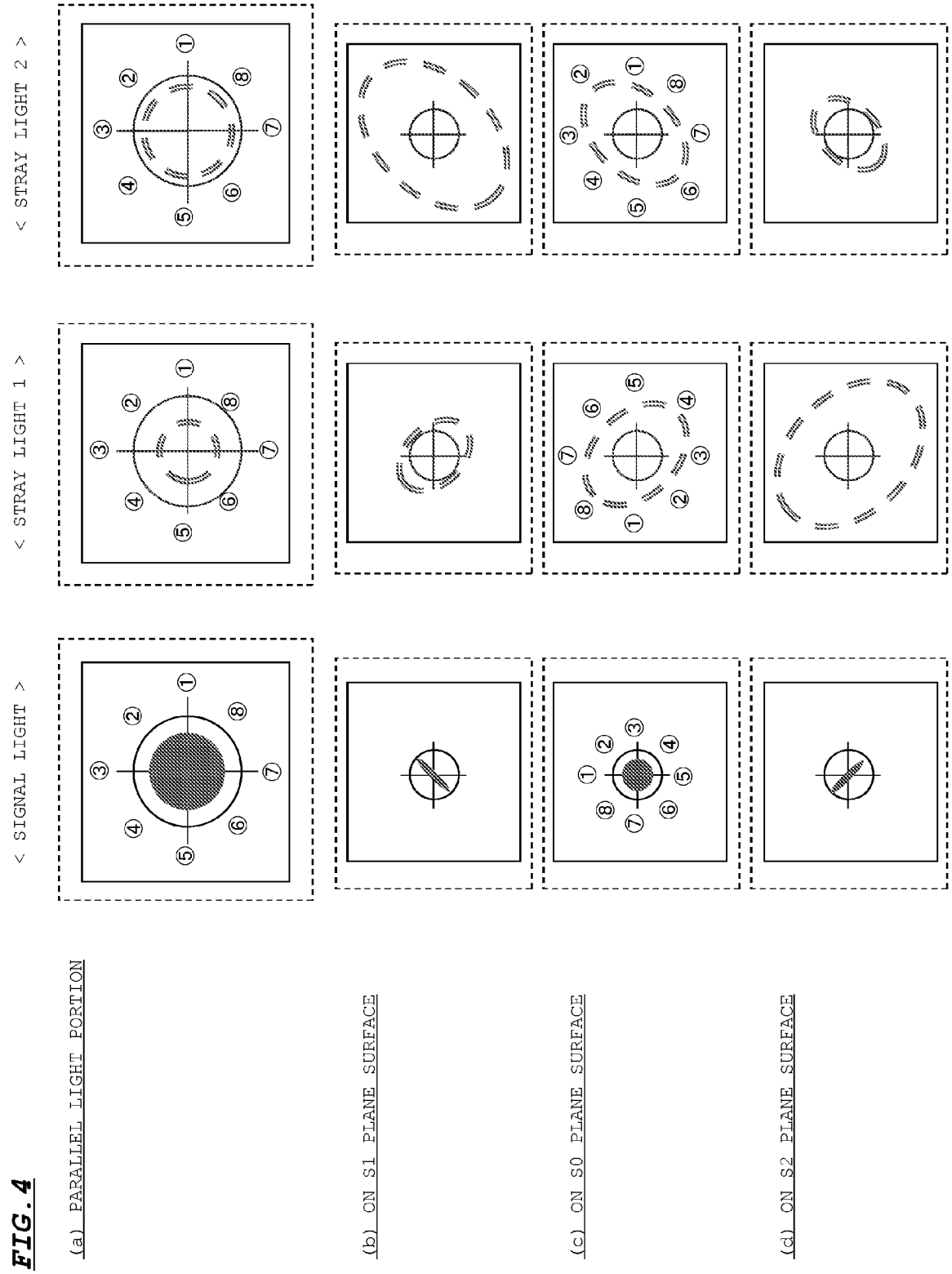

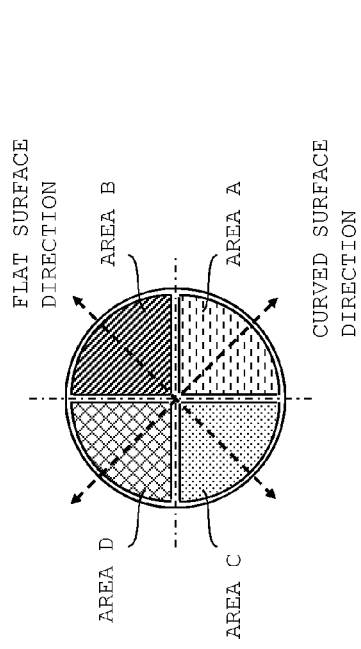
FIG. 5A  LIGHT FLUX DIVIDING PATTERN
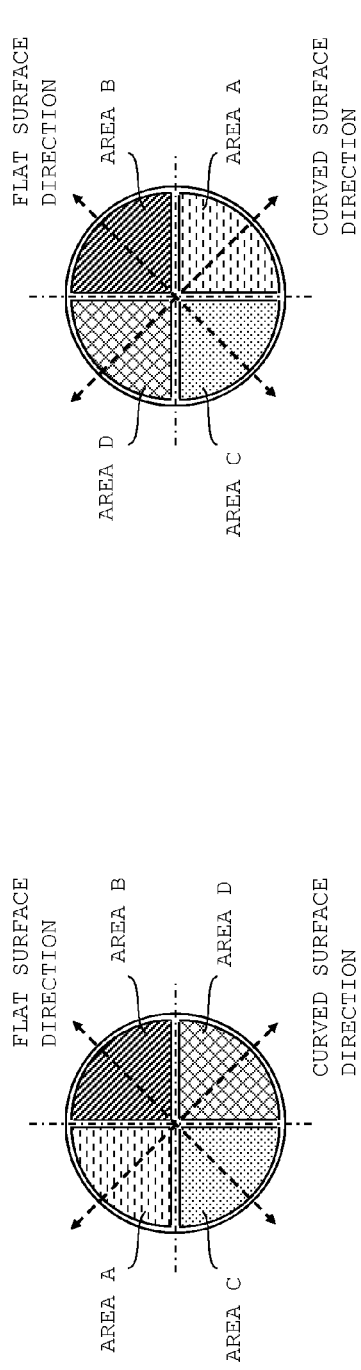
FIG. 5B  SIGNAL LIGHT
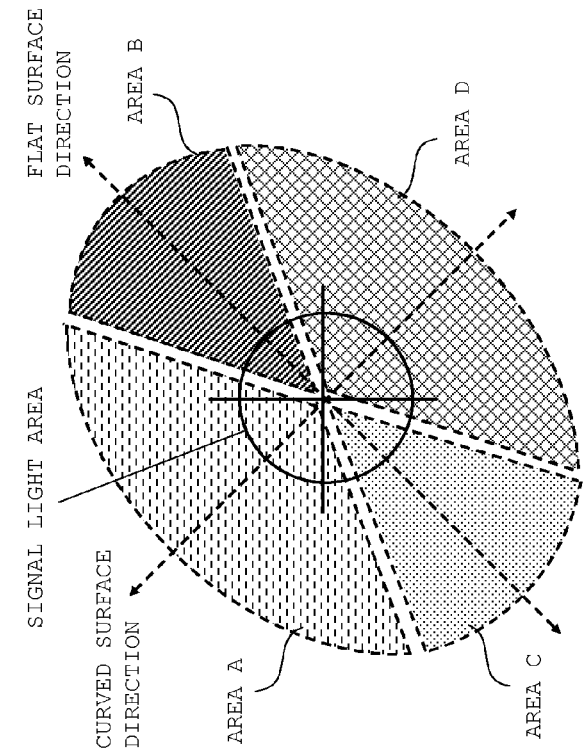
FIG. 5C  STRAY LIGHT 1
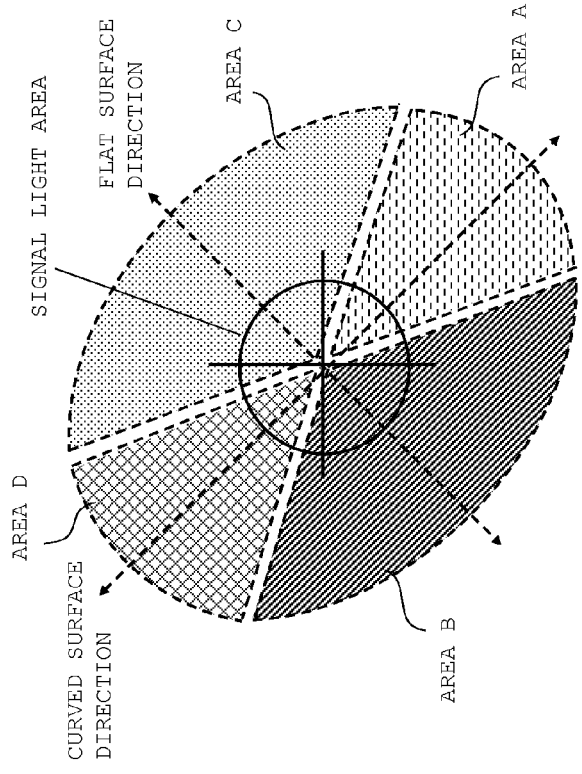
FIG. 5D  STRAY LIGHT 2

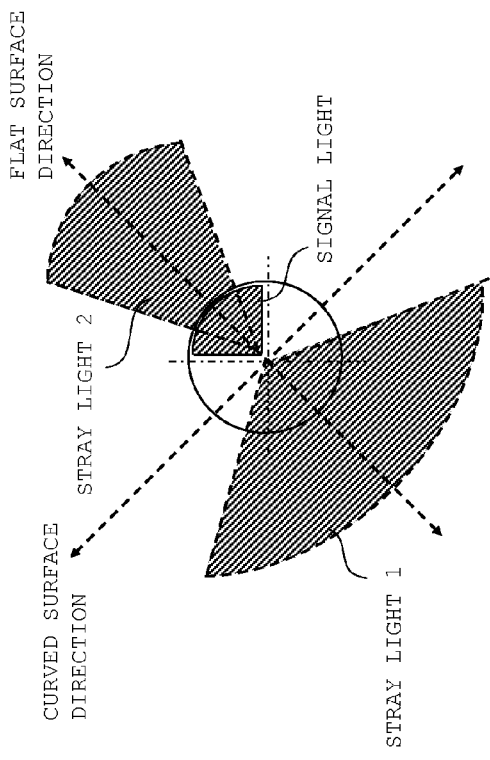
FIG. 6A  LIGHT FLUX STATE IN AREA A
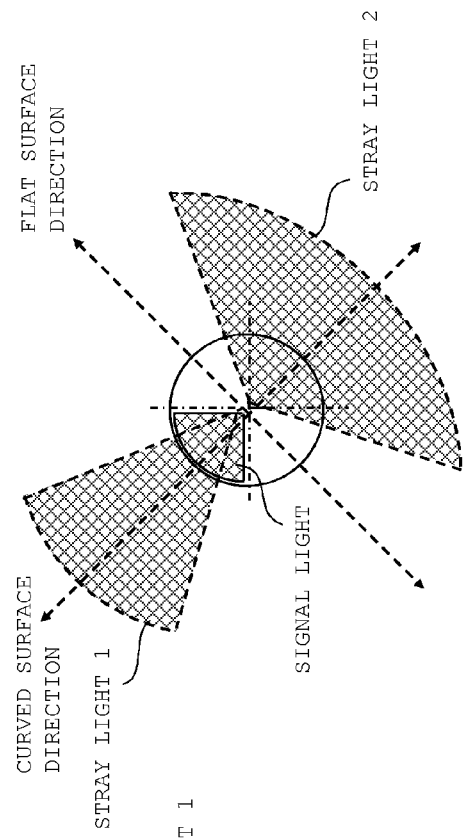
FIG. 6B  LIGHT FLUX STATE IN AREA B
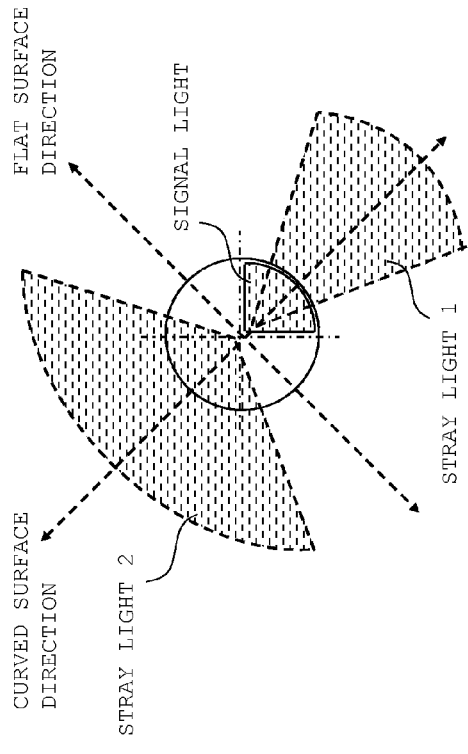
FIG. 6C  LIGHT FLUX STATE IN AREA C
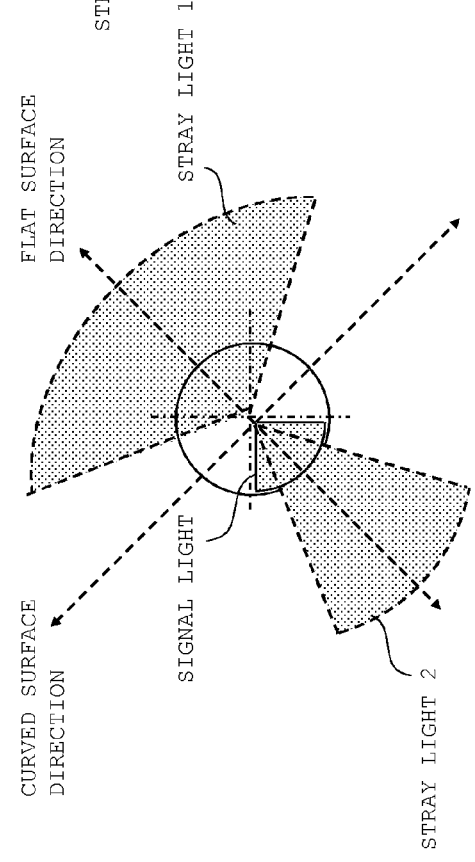
FIG. 6D  LIGHT FLUX STATE IN AREA D

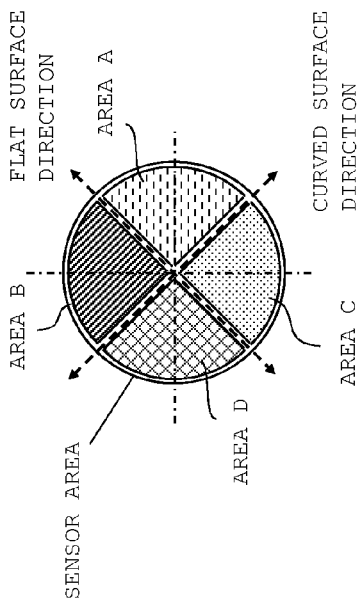
FIG. 7A  LIGHT FLUX DIVIDING PATTERN
FIG. 7B  SIGNAL LIGHT
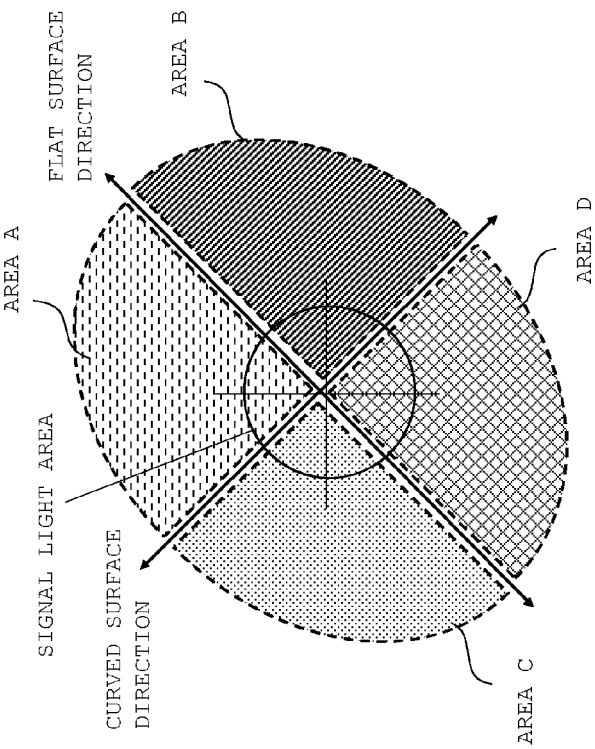
FIG. 7D  STRAY LIGHT 2
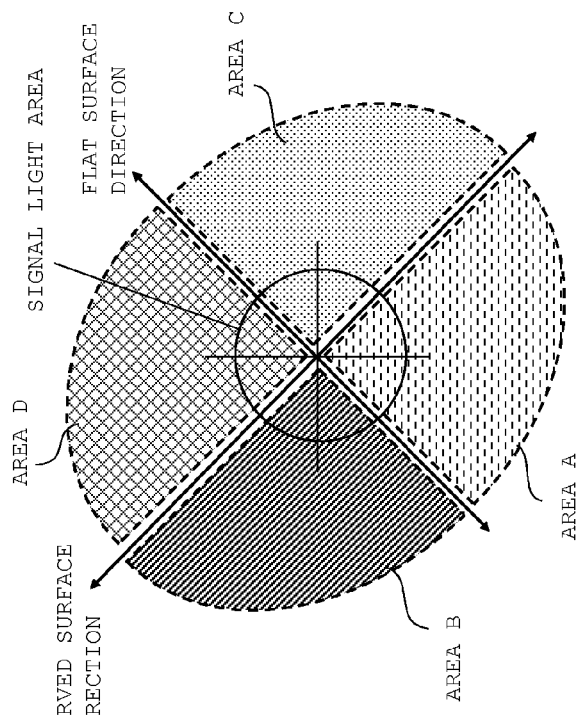
FIG. 7C  STRAY LIGHT 1

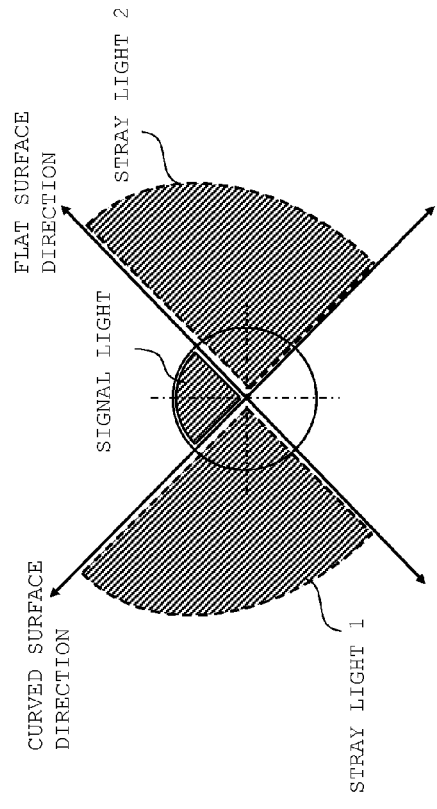
FIG. 8A  LIGHT FLUX STATE IN AREA A
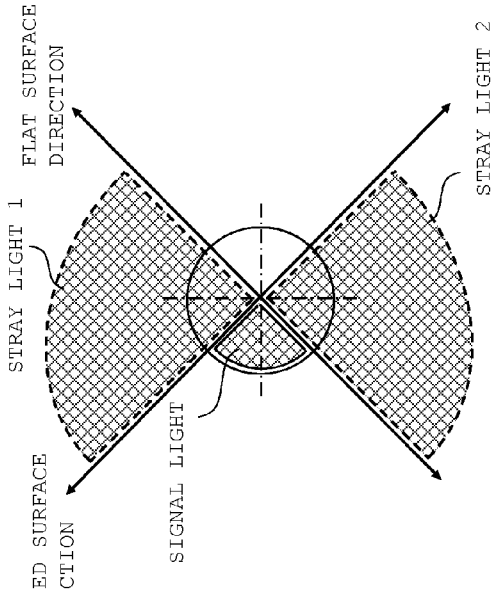
FIG. 8B  LIGHT FLUX STATE IN AREA B
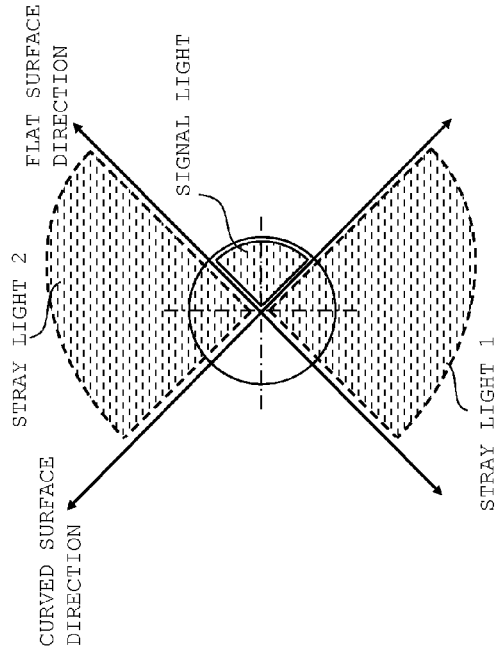
FIG. 8C  LIGHT FLUX STATE IN AREA C
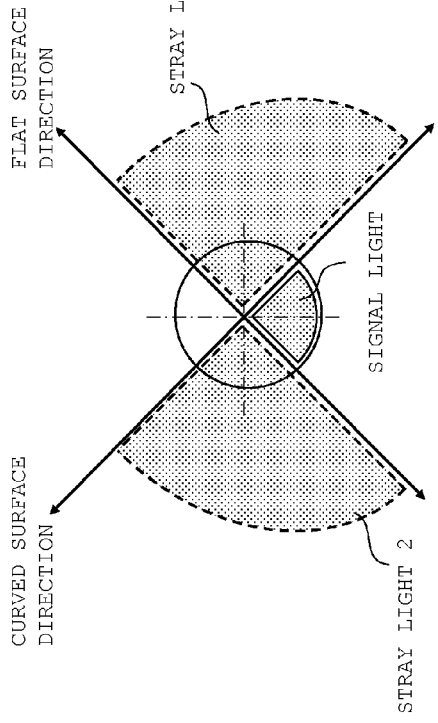
FIG. 8D  LIGHT FLUX STATE IN AREA D

LIGHT FLUX ON PLANE S0

PROVIDE ANGULAR CHANGE TO EACH AREA $FE = (A+B+E+F) - (C+D+G+H)$
$PP = (A+B+G+H) - (C+D+E+F)$ $FE = (A+B+E+F) - (C+D+G+H)$
$PP = (A+B+G+H) - (C+D+E+F)$

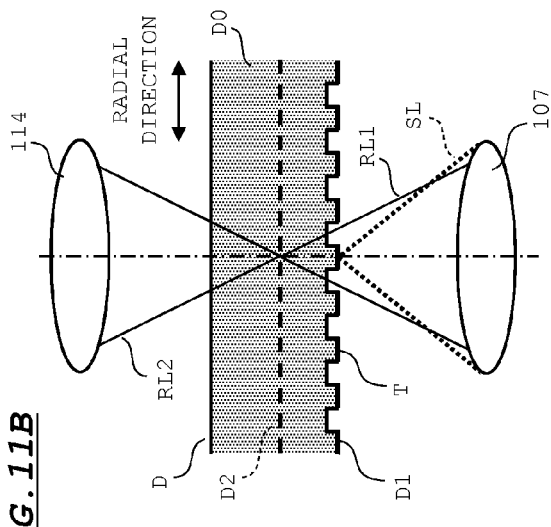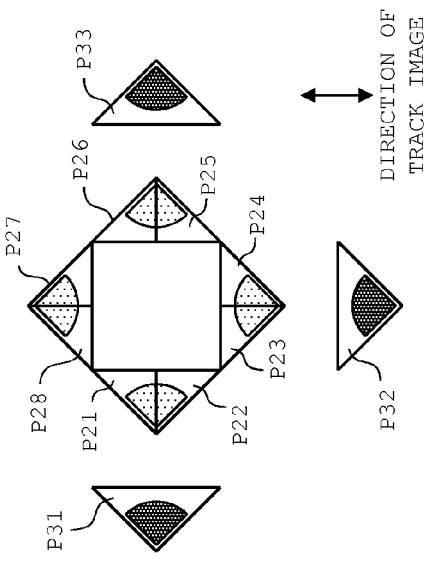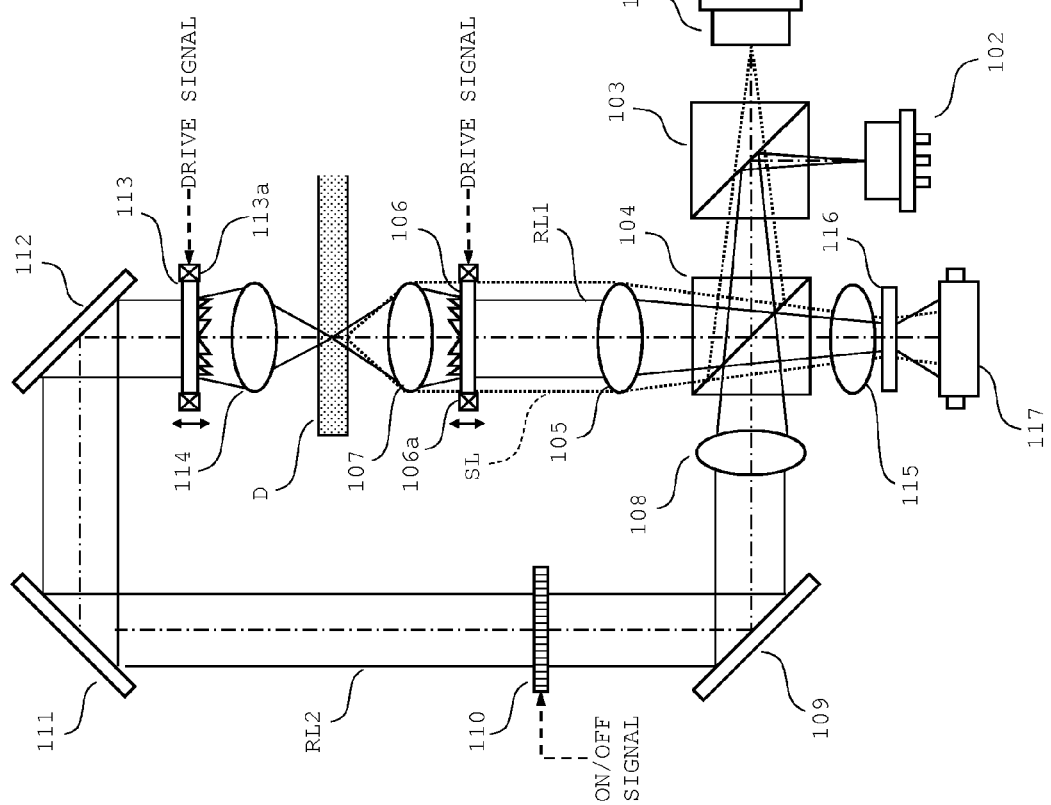

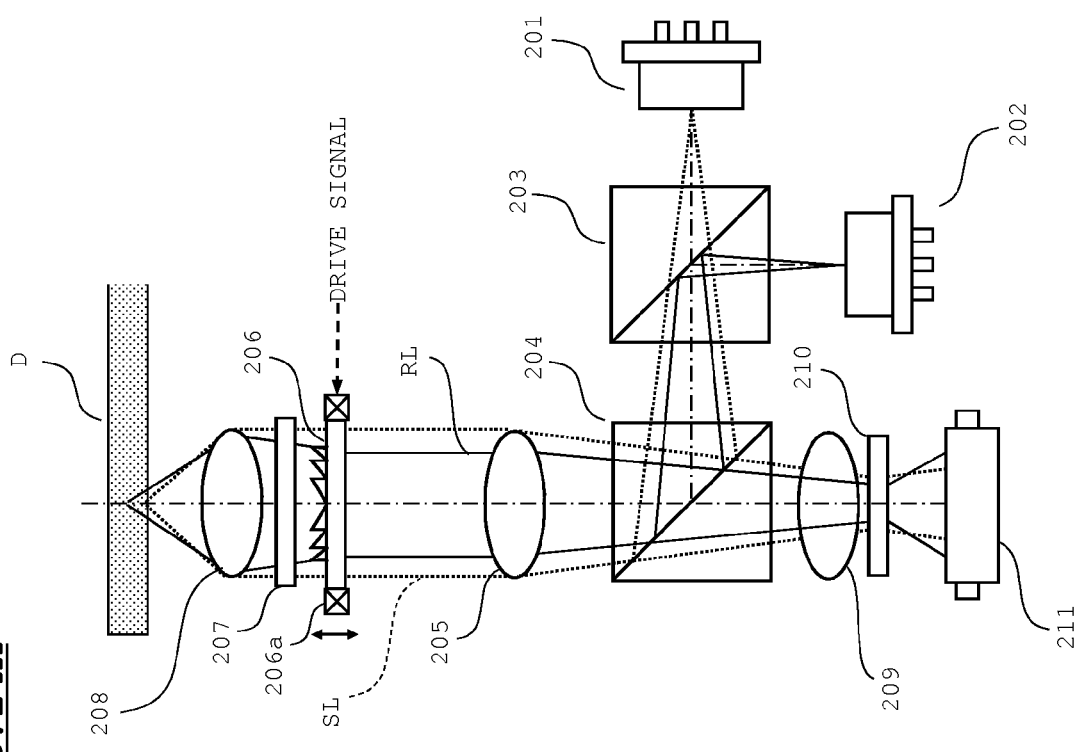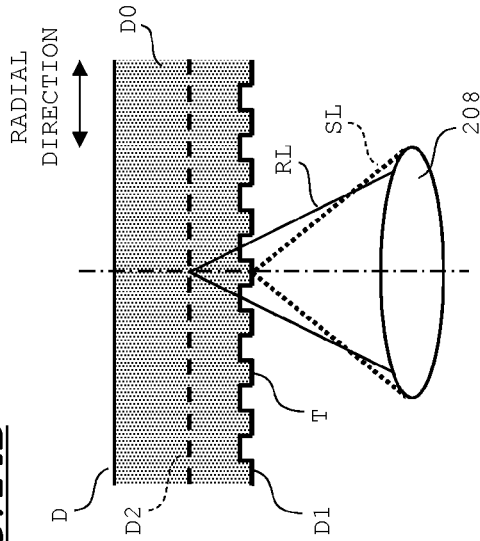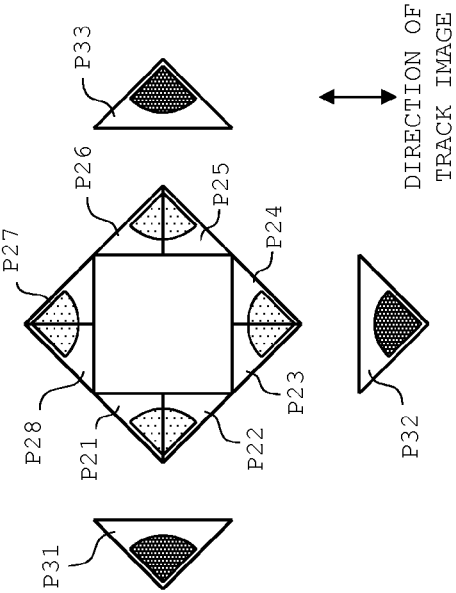
FIG. 14A
FIG. 14B
FIG. 14C

OPTICAL PICKUP DEVICE

This application claims priority under 35 U.S.C. Section 119 of Japanese Patent Application No. 2009-223512 filed Sep. 28, 2009, entitled "OPTICAL PICKUP DEVICE". The disclosure of the above applications is incorporated herein by reference.

BACKGROUND OF THE INVENTION

1. Field of the Invention

The present invention relates to an optical pickup device, and more particularly to a device for use in irradiating a recording medium having laminated recording layers and servo layers with laser light.

2. Disclosure of Related Art

In recent years, as the capacity of an optical disc has been increasing, the number of recording layers has been increasing. Further, recently, there has been proposed a recording method, wherein laser light is converged on different depth positions in one recording layer. With use of the above method, plural signal layers are formed in one recording layer. This enables to enhance the recording capacity of a recording medium. Examples of such a recording method are a method (micro hologram method), wherein interference of two laser light is used, and a method (two photon absorption method), wherein two photon absorption is used.

In the above recording methods, a servo layer is formed independently of a recording layer to cause laser light to scan along a predetermined trajectory, while converging the laser light at an intended depth position in the recording layer. A guide track is formed on the servo layer and laser light for servo control is converged on the guide track. For instance, recording/reproducing laser light and servo laser light are entered into one objective lens. The objective lens is controlled in such a manner that the focus spot of servo laser light follows a track on the servo layer. With this arrangement, the focus spot of recording/reproducing laser light scans the same trajectory as the track at a predetermined depth position in the recording layer. Adjusting the divergence angle of recording/reproducing laser light at the time of incidence into the objective lens enables to adjust the depth position of the focus spot of recording/reproducing laser light in the recording layer. Thus, the focus spot of recording/reproducing laser light scans the same trajectory as the track at a predetermined depth position.

In the above arrangement, recording/reproducing laser light, and servo laser light have different wavelengths from each other. A servo layer is made of a material having a high reflectance with respect to servo laser light, but having a low reflectance with respect to recording/reproducing laser light. Accordingly, even if recording/reproducing laser light and servo laser light are simultaneously entered into a recording medium, substantially only recording/reproducing laser light is entered into a recording layer.

With the above arrangement, servo laser light reflected on a servo layer, and recording/reproducing laser light reflected on a signal layer are transmitted through one objective lens, and propagate along the same optical path. Accordingly, it is required to provide an arrangement for separating these two laser light, and guiding the separated laser light to corresponding photodetectors.

Further, since plural signal layers are formed in a recording layer in the depth direction of a recording medium, even if recording/reproducing laser light is converged on one (target signal layer) of the signal layers, laser light (stray light) reflected on a signal layer other than the target signal layer may be guided to a photodetector, in addition to the laser light (signal light) reflected on the target signal layer. Thus, in the above arrangement, it is necessary to provide an arrangement for suppressing incidence of stray light into a photodetector for signal light.

SUMMARY OF THE INVENTION

A main aspect of the invention is directed to an optical pickup device for irradiating a recording medium having laminated recording layers and servo layers with laser light. The optical pickup device according to this aspect includes a first laser light source which emits first laser light having a first wavelength; a second laser light source which emits second laser light having a second wavelength different from the first wavelength; an objective lens which converges the first laser light emitted from the first laser light source, and the second laser light emitted from the second laser light source on the recording medium; a focus position adjuster which changes a focus position of the first laser light by the objective lens in an optical axis direction, an astigmatism element which imparts astigmatism to the first laser light and the second laser light reflected on the recording medium; a spectral element which imparts diffraction in such a manner that at least four light fluxes of the first laser light are separated from each other, when a light flux of the first laser light and a light flux of the second laser light reflected on the recording medium are divided into four by a first straight line in parallel to a converging direction by the astigmatism element, and a second straight line perpendicular to the first straight line, and that the four light fluxes of the first laser light propagate on an outer side than the light flux of the second laser light; and a photodetector including a first sensor group which receives the separated four light fluxes of the first laser light to generate a reproduction signal, and a second sensor group which receives the second laser light to generate a servo signal for use in controlling the objective lens.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how light rays propagate) in an embodiment of the invention.

FIGS. 2A and 2B are diagrams for describing the technical principle (as to how light rays propagate) in the embodiment.

FIG. 4 is a diagram for describing the technical principle (as to how light rays propagate) in the embodiment.

FIGS. 5A through 5D are diagrams for describing the technical principle (a light flux distribution state) in the embodiment.

FIGS. 6A through 6D are diagrams for describing the technical principle (a light flux distribution state) in the embodiment.

FIGS. 7A through 7D are diagrams for describing the technical principle (a light flux distribution state) in the embodiment.

FIGS. 8A through 8D are diagrams for describing the technical principle (a light flux distribution state) in the embodiment.

FIGS. 11A through 11C are diagrams showing an optical system of an optical pickup device in example 1.

FIGS. 14A through 14C are diagrams for describing an optical system of an optical pickup device in example 2.

Figure 3A:
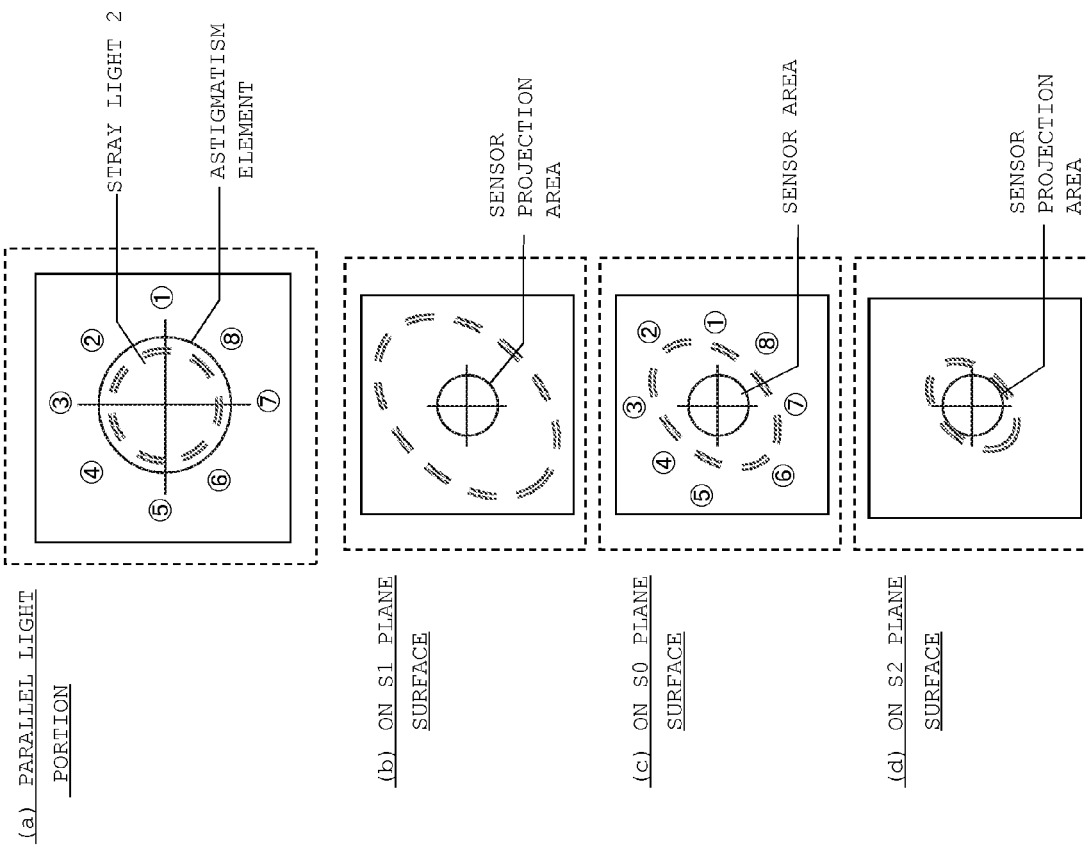
FIGS. 3A and 3B are diagrams for describing the technical principle (as to how light rays propagate) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 10D. The embodiment is described based on the premise that laser light is irradiated onto a recording medium having plural signal layers in one recording layer in the depth direction. In the following, a signal layer on which laser light is converged, out of the plural signals layers, is particularly called as a "target signal layer". The recording medium having the above construction is manufactured by recording information by the aforementioned micro hologram method or two photon absorption method.

FIG. 1A is a diagram showing a convergence state of signal light and stray light, in the case where laser light (signal light) reflected on a target signal layer is entered into an astigmatism element such as an anamorphic lens, as parallel light. "Stray light 1" is laser light reflected on a signal layer adjacent to the targeted signal layer at a rearward position of the target signal layer, when viewed from the side of a laser light incident surface. "Stray light 2" is laser light reflected on a signal layer adjacent to the targeted signal layer at a forward position of the targeted signal layer, when viewed from the side of the laser light incident surface. FIG. 1A shows a state that signal light is focused on the targeted signal layer.

As shown in FIG. 1A, a focal line is defined on a plane S1 by convergence of signal light in a "curved surface direction" in FIG. 1A, and a focal line is defined on a plane S2 by convergence of signal light in a "flat surface direction" perpendicular to the curved surface direction, by the function of the anamorphic lens. Then, the spot of signal light is minimized (a least circle of confusion is defined) on a plane S0 between the plane S1 and the plane S2. In focus adjustment based on an astigmatism method, a light receiving surface of a photodetector is disposed on the plane S0.

In this example, to simplify the description on the astigmatism function by the anamorphic lens, the terms "curved surface direction" and "flat surface direction" are used. Actually, however, as far as the anamorphic lens has a function of defining focal lines at different positions from each other, the anamorphic lens may have a curvature in the "flat surface direction" shown in FIG. 1A. In the case where laser light is entered into the anamorphic lens in a convergence state, the shape of the anamorphic lens in the "flat surface direction" may be linear (curvature radius=∞).

As shown in FIG. 1A, the focal line position of stray light 1 (in FIG. 1A, a range between two focal line positions defined by the astigmatism element is referred to as a "convergent range") is closer to the astigmatism element with respect to the focal line position of signal light; and the focal line position of stray light 2 is away from the astigmatism element with respect to the focal line position of signal light.

The sections (a) through (d) in FIG. 1B are diagrams respectively showing beam configurations of signal light on a parallel light portion, and the planes S1, S0, and S2. Signal light entered into the astigmatism element in the shape of a true circle is converted into light of an elliptical shape on the plane S1, and converted into light of a substantially true circle on the plane S0, and then converted into light of an elliptical shape on the plane S2. In this example, the beam configuration on the plane S1 and the beam configuration on the plane S2 have such a relation that the major axes of the beams are perpendicular to each other.

In this example, as shown in FIG. 1A and the section (a) in FIG. 1B, in the case where eight positions (positions 1 through 8: in FIGS. 1A and 1B, the positions 1 through 8 are indicated by the numbers enclosed by a circle) are defined counterclockwise on the outer periphery of the beam on the parallel light portion, light rays passing the positions 1 through 8 are each subjected to convergence by the astigmatism element. The position 4 and the position 8 are located on a parting line dividing a beam section of the parallel light portion into two parts by a straight line that is in parallel to the curved surface direction, and the position 2 and the position 6 are located on a parting line dividing the beam section of the parallel light portion into two parts by a straight line that is in parallel to the flat surface direction. The positions 1, 3, 5, and 7 are located on mid positions of an arc portion of the outer perimeter respectively defined by the positions 2, 4, 6, and 8.

Light rays passing the positions 4 and 8 on the parallel light portion are converged into a focal line in the curved surface direction on the plane S1, and entered into the plane S0. Accordingly, the light rays passing the positions 4 and 8 on the parallel light portion pass the positions 4 and 8 shown in the section (c) of FIG. 1B on the plane S0. Similarly, the light rays passing the positions 1, 3, 5, and 7 on the parallel light portion are converged into a focal line in the curved surface direction on the plane S1, and entered into the plane S0. Accordingly, the light rays passing the positions 1, 3, 5, and 7 on the parallel light portion pass the positions 1, 3, 5, and 7 shown in the section (c) of FIG. 1B on the plane S0. On the other hand, the light rays passing the positions 2 and 6 on the parallel light portion are entered into the plane S0 without convergence into a focal line in the curved surface direction on the plane S1. Accordingly, the light rays passing the positions 2 and 6 on the parallel light portion pass the positions 2 and 6 shown in the section (c) of FIG. 1B on the plane S0.

Sections (a) through (d) in FIG. 2B are diagrams respectively showing beam configurations and light ray passing positions of stray light 1 on the parallel light portion, and the planes S1, S0, and S2. As shown in the section (a) of FIG. 2B, similarly to the signal light, in the case where eight positions 1 through 8 are defined on the outer periphery of stray light 1, light rays passing the eight positions 1 through 8 on the parallel light portion are converged into a focal line in the curved surface direction or a focal line in the flat surface direction, and entered into the plane S0. Accordingly, the light rays passing the positions 1 through 8 on the parallel light portion respectively pass the positions 1 through 8 shown in the section (c) of FIG. 2B on the plane S0.

Figure 3B:
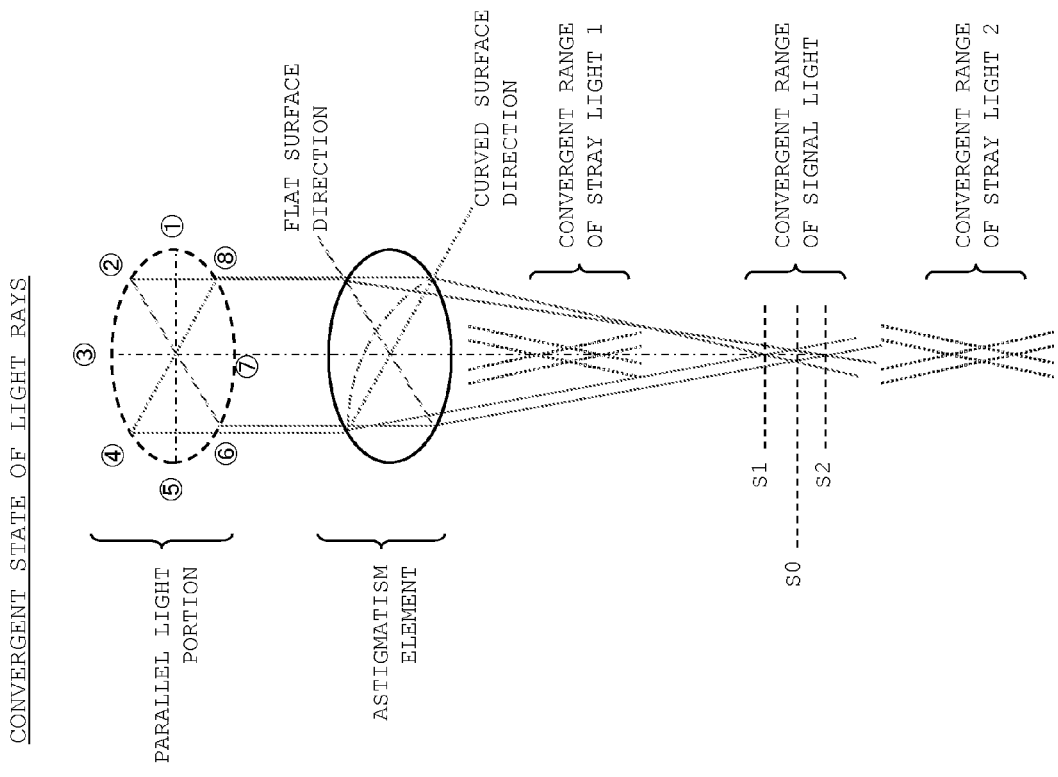

Sections (a) through (d) in FIG. 3B are diagrams respectively showing beam configurations and light ray passing positions of stray light 2 on the parallel light portion, and the planes S1, S0, and S2. As shown in the section (a) of FIG. 3B, similarly to the signal light, in the case where eight positions 1 through 8 are defined on the outer periphery of stray light 2, light rays passing the eight positions 1 through 8 on the parallel light portion are entered into the plane S0, without convergence into a focal line in the curved surface direction or a focal line in the flat surface direction. Accordingly, the light rays passing the positions 1 through 8 on the parallel light portion respectively pass the positions 1 through 8 shown in the section (c) of FIG. 3B on the plane S0.

FIG. 4 shows diagrams of the beam configurations and the light ray passing positions of signal light, stray light 1, and stray light 2 on the parallel light portion, and the planes S1, S0, and S2 in comparison with each other. As is obvious from the comparison between the diagrams in the section (c) of FIG. 4, light fluxes of signal light, stray light 1, and stray light 2 that have passed the position 1 on the parallel light portion respectively pass the different outer peripheral positions from each other on the plane S0. Likewise, light fluxes of signal light, stray light 1, and stray light 2 that have passed the positions 3, 4, 5, 7, and 8 on the parallel light portion respectively pass the different outer peripheral positions from each other on the plane S0. The light fluxes of signal light and stray light 2 that have passed the positions 2 and 6 on the parallel light portion respectively pass the corresponding same outer peripheral positions on the plane S0. In this case, the light fluxes of signal light and stray light 1 that have passed the positions 2 and 6 on the parallel light portion respectively pass the different outer peripheral positions from each other on the plane S0, and the light fluxes of stray light 1 and stray light 2 that have passed the positions 2 and 6 on the parallel light portion respectively pass the different outer peripheral positions from each other on the plane S0.

Next, a relation between an area dividing pattern of signal light, stray light 1, and stray light 2 on the parallel light portion, and an irradiation area of signal light, stray light 1, and stray light 2 on the plane S0 is investigated, considering the above phenomenon.

First, as shown in FIG. 5A, let it be assumed that signal light, stray light 1, and stray light 2 on the parallel light portion are each divided into four light flux areas A through D by two straight lines respectively inclined with respect to the flat surface direction and the curved surface direction by 45 degrees. This dividing pattern corresponds to an area dividing based on a conventional astigmatism method.

By the area dividing, signal light in the light flux areas A through D has a distribution on the plane S0 as shown in FIG. 5B due to the above phenomenon. Stray light 1 and stray light 2 in the light flux areas A through D respectively have distributions on the plane S0 as shown in FIGS. 5C and 5D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 6A through 6D. In this case, the signal light in each of the light flux areas is necessarily superimposed on one of the stray light 1 and the stray light 2 in the corresponding same light flux area. Accordingly, if the signal light in each of the light flux areas is received by a sensing portion on the photodetector, at least the stray light 1 or the stray light 2 in the corresponding light flux area is simultaneously entered into the corresponding sensing portion, which may deteriorate a detection signal.

In contrast, as shown in FIG. 7A, let it be assumed that signal light, stray light 1, and stray light 2 on the parallel light portion are each divided into four light flux areas A through D by two straight lines, which are respectively in parallel to the flat surface direction and the curved surface direction. Then, signal light in the light flux areas A through D has a distribution on the plane S0 as shown in FIG. 7B due to the above phenomenon. Stray light 1 and stray light 2 in the light flux areas A through D respectively have distributions on the plane S0, as shown in FIGS. 7C and 7D due to the above phenomenon.

In this example, if the signal light, the stray light 1, and the stray light 2 on the plane S0 are extracted with respect to each of the light flux areas, distributions of the signal light, the stray light 1, and the stray light 2 are as shown in FIGS. 8A through 8D. In this case, the signal light in each of the light flux areas is not superimposed with any one of the stray light 1 and the stray light 2 in the corresponding light flux area. Accordingly, if only the signal light is allowed to be received by a sensing portion, after the light fluxes (of signal light, stray light 1, and stray light 2) in each of the light flux areas are dispersed in different directions from each other, only the signal light is allowed to be entered into the corresponding sensing portion to thereby prevent incidence of stray light. Thus, deterioration of a detection signal resulting from stray light can be avoided.

As described above, dividing signal light, stray light 1, and stray light 2 each into four light flux areas A through D by two straight lines, which are respectively in parallel to the flat surface direction and the curved surface direction, and dispersing the light passing through the light flux areas A through D away from each other on the plane S0 enables to extract only the signal light. This embodiment is made based on the above principle.

Figure 9B:
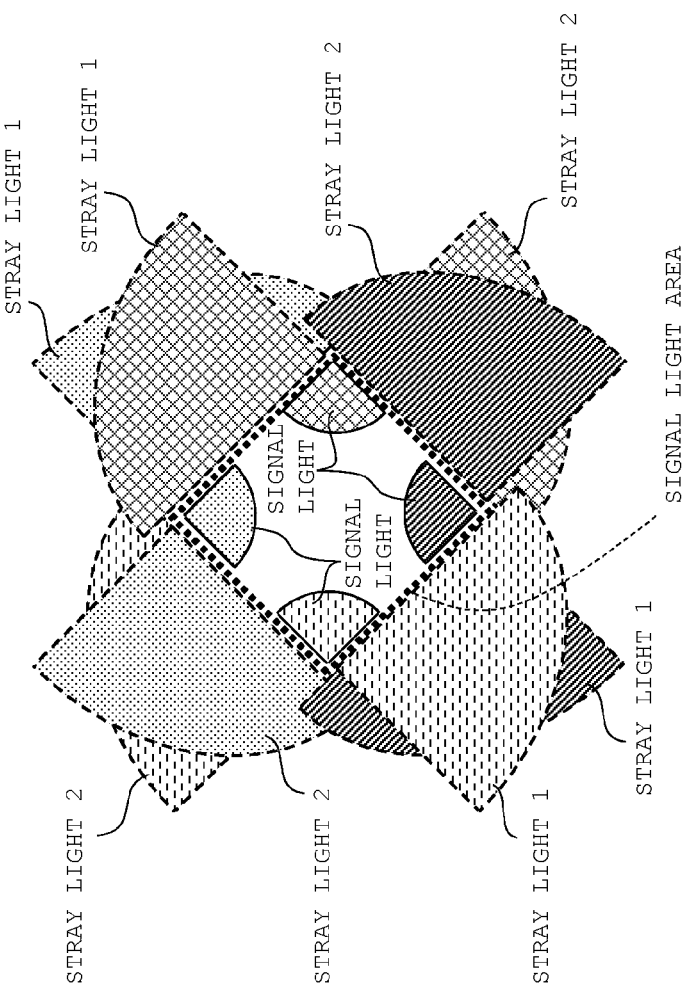
FIGS. 9A and 9B are diagrams for describing the technical principle (a relation between an angle changing function and a light flux distribution state) in the embodiment.
Figure 9A:
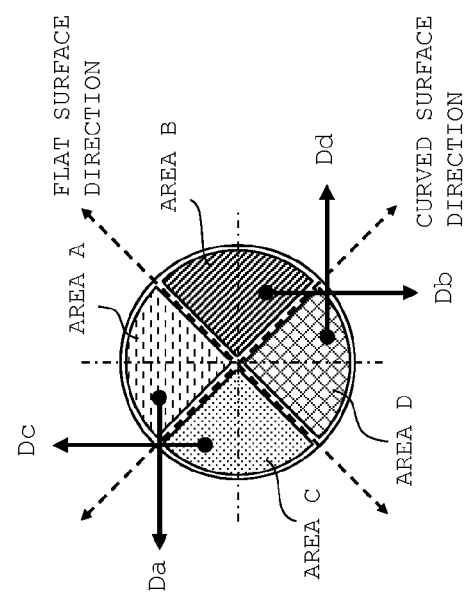

FIGS. 9A and 9B are diagrams showing distribution states of signal light, stray light 1, and stray light 2 on the plane S0, in the case where propagating directions of light fluxes (of signal light, stray light 1, and stray light 2) passing the four light flux areas A through D shown in FIG. 7A are changed from each other by a predetermined angle. In this example, as shown in FIG. 9A, the propagating directions of light fluxes (of signal light, stray light 1, and stray light 2) passing the four light flux areas A through D are respectively changed into directions Da, Db, Dc, and Dd by a predetermined angle amount a (not shown). The directions Da, Db, Dc, and Dd are inclined with respect to each of the flat surface direction and the curved surface direction by 45 degrees.

In this example, adjusting the angle amount a with respect to the directions Da, Db, Dc, and Dd enables to distribute the signal light, the stray light 1, and the stray light 2 in each of the light flux areas on the plane S0, as shown in FIG. 9B. As a result, as shown in FIG. 9B, a signal light area where only the signal light exists can be defined on the plane S0. Setting a sensing portion of the photodetector on the signal light area allows only the signal light in each of the light flux areas to be received on the corresponding sensing portion.

Figure 10A:
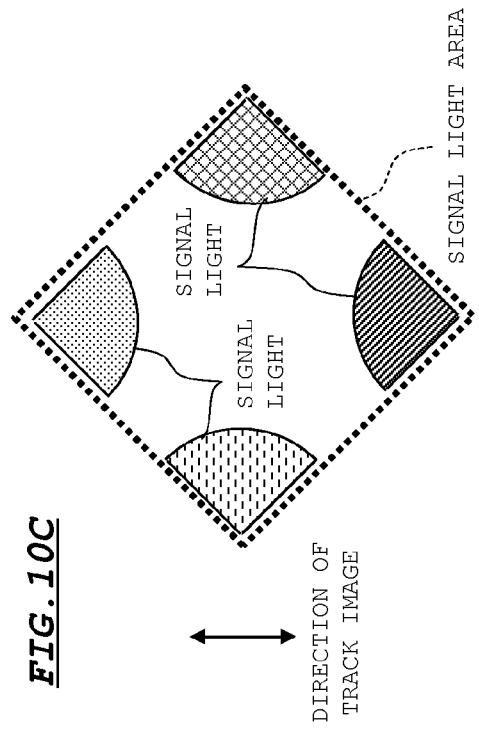
FIGS. 10A through 10D are diagrams showing a sensing portion disposing method in the embodiment.
Figure 10C:
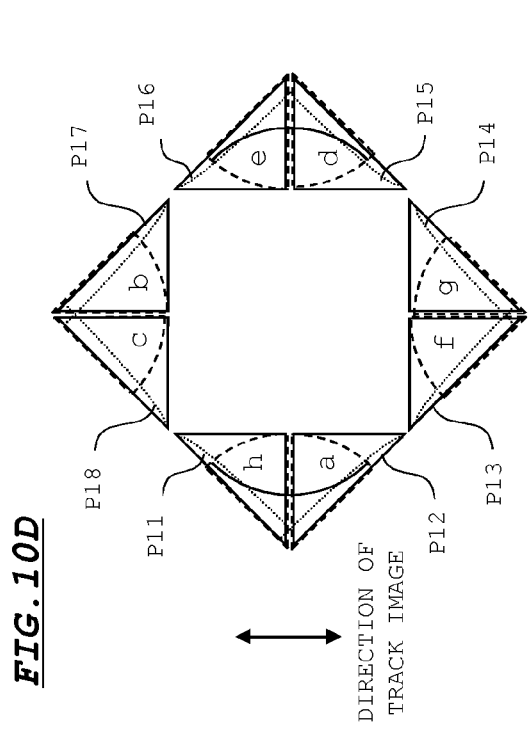
Figure 10B:
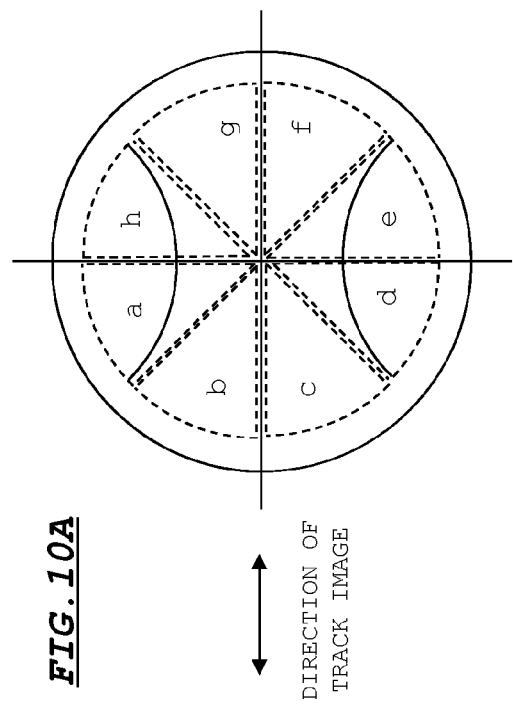
Figure 10D:
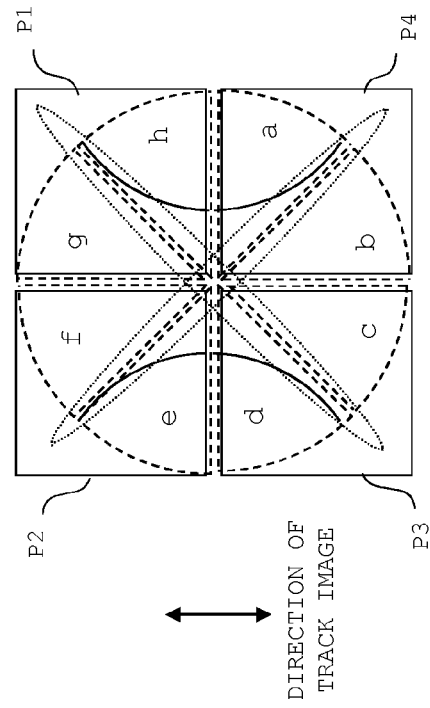

FIGS. 10A through 10D are diagrams for describing a method for arranging a sensing portion. FIGS. 10A and 10B are diagrams showing a light flux dividing method and a sensing portion based on a conventional astigmatism method. FIGS. 10C and 10D are diagrams showing a light flux dividing method and a sensing portion based on the above principle. In this example, a track direction is inclined with respect to each of the flat surface direction and the curved surface direction by 45 degrees. To simplify the description, a light flux is divided into eight light flux areas "a" through "h" in FIGS. 10A, 10B and 10D. Diffraction images (track images) by a track groove are indicated by the solid lines in FIGS. 10A, 10B and 10D. Beam configurations in an out-of-focus state are indicated by the dotted lines in FIGS. 10B and 10D.

It is known that a superimposed state of a zero-th order diffraction image and a first order diffraction image of signal light resulting from a track groove is obtained by (track pitch× NA of objective lens). As shown in FIGS. 10A, 10B, and 10D, a condition for forming a first order diffraction image within the four light flux areas "a", "d", "e", and "h" is expressed by: wavelength/(track pitch×NA of objective lens)>√2.

In the conventional astigmatism method, sensing portions P1 through P4 (a four-division sensor) of a photodetector are set as shown in FIG. 10B. In this arrangement, assuming that detection signal components based on the light intensities of the light flux areas "a" through "h" are expressed by A through H, a focus error signal FE and a push-pull signal PP are obtained by the equations (1) and (2).

$$FE=(A+B+E+F)-(C+D+G+H) \quad (1)$$

$$PP=(A+B+G+H)-(C+D+E+F) \quad (2)$$

On the other hand, in the distribution state shown in FIG. 9B, as described above, signal light is distributed in the state as shown in FIG. 10C within the signal light area. In this case, the signal light passing the light flux areas "a" through "h" in FIG. 10A is as shown in FIG. 10D. Specifically, the signal light passing the light flux areas "a" through "h" in FIG. 10A is guided to the light flux areas "a" through "h" shown in FIG. 10D on the plane S0 where the sensing portion of the photodetector is disposed.

Accordingly, setting the sensing portions P11 through P18 at the positions of the light flux areas "a" through "h" shown in FIG. 10D in the superimposed state shown in FIG. 10D enables to generate a focus error signal and a push-pull signal by performing the same computation as applied in FIG. 10B. Specifically, assuming that detection signals from the sensing portions which receive light fluxes in the light flux areas "a" through "h" are expressed by A through H, similarly to the arrangement shown in FIG. 10B, a focus error signal FE and a push-pull signal PP can be obtained by performing computation in accordance with the equation (1) and (2).

As described above, according to the principle, signal light and stray light 1 and 2 in a parallel light portion are divided into four light flux areas A through D by two straight lines in parallel to the flat surface direction and the curved surface direction shown in FIG. 1A, the light passing the light flux areas A through D is dispersed, and signal light in each of the light flux areas A through D after the dispersion is individually received by two-divided light receiving portions (two-division sensors). Accordingly, a focus error signal and a push-pull signal (tracking error signal) can be generated by performing the same computation as applied to the process based on the conventional astigmatism method.

In addition, according to the principle, a reproduction RF signal can be generated by summing up the signals from each sensing portion disposed in the signal light area. As described above, since there is no likelihood that stray light may be entered into the signal light area, the reproduction RF signal obtained as described above has high quality.

Example 1

In the following, an example based on the above principle is described. The inventive example is an example, wherein the invention is applied to an optical pickup device compatible with a recording medium using the micro hologram method. In this example, a disc is used as a recording medium.

FIG. 11A shows an optical system of an optical pickup device in this example. A laser light source 101 emits laser light (hereinafter, called as "servo light" in this example) having a wavelength of about 660 nm. A laser light source 102 emits laser light (hereinafter, called as "recording/reproducing light" in this example) having a wavelength of about 405 nm. A dichroic prism 103 transmits servo light emitted from the laser light source 101, and reflects recording/reproducing light emitted from the laser light source 102. Servo light and recording/reproducing light have optical axes thereof aligned by the dichroic prism 103.

The reference numeral 104 denotes a non-polarized beam splitter. A part of servo light and recording/reproducing light that have been entered into the beam splitter 104 from the side of the dichroic prism 103 is reflected on the beam splitter 104, and the remaining part thereof is transmitted through the beam splitter 104. In the following, in this example, servo light and recording/reproducing light reflected on the beam splitter 104 are respectively called as servo light SL and recording/reproducing light RL1, and recording/reproducing light transmitted through the beam splitter 104 is called as recording/reproducing light RL2.

Servo light SL and recording/reproducing light RL1 reflected on the beam splitter 104 are converted into parallel light by a collimator lens 105, and then entered into a diffraction hologram 106.

The diffraction hologram 106 acts only on light having the wavelength band of recording/reproducing light RL1, out of servo light SL and recording/reproducing light RL1. The diffraction hologram 106 has a function of diverging recording/reproducing light RL1 by a predetermined angle, and a function of limiting the aperture. Further, the diffraction hologram 106 is supported to be displaceable in the optical axis direction in accordance with a drive signal by an actuator 106a. The focus position of recording/reproducing light RL1 by an objective lens 107 is adjustable in the depth direction by displacing the diffraction hologram 106 in the optical axis direction. Servo light SL and recording/reproducing light RL1 transmitted through the diffraction hologram 106 are converged on a disc D by the objective lens 107.

After having been converted into parallel light by a collimator lens 108, recording/reproducing light RL2 transmitted through the beam splitter 104 is entered into a shutter 110 through a mirror 109. The shutter 110 is switched between a state that recording/reproducing light RL2 is transmitted, and a state that recording/reproducing light RL2 is blocked in accordance with a drive signal. The shutter 110 is brought to a light transmissive state at the time of recording, and is brought to a light blocking state at the time of reproducing. Recording/reproducing light RL2 transmitted through the shutter 110 is entered into a diffraction hologram 113 through mirrors 111 and 112.

The diffraction hologram 113 acts only on light having the wavelength band of recording/reproducing light RL2. The diffraction hologram 113 has a function of diverging recording/reproducing light RL2 by a predetermined angle, and a function of limiting the aperture. Further, the diffraction hologram 113 is supported to be displaceable in the optical axis direction in accordance with a drive signal by an actuator 113a. The focus position of recording/reproducing light RL2 by an objective lens 114 is adjustable in the depth direction by displacing the diffraction hologram 113 in the optical axis direction. Recording/reproducing light RL2 transmitted through the diffraction hologram 113 is converged on the disc D by the objective lens 114.

FIG. 11B is a diagram showing an irradiation state of servo light SL, and recording/reproducing light RL1 and RL2 with respect to the disc D. The disc D is provided with a recording layer D0 and a servo layer D1. The servo layer D1 is disposed on a surface of the recording layer D0 on the side of the objective lens 107. Further, a track T is formed on the servo layer D1 in a spiral form from an inner periphery toward an outer periphery of the disc D. The servo layer D1 is made of a material having a high reflectance with respect to servo light SL, but having a low reflectance with respect to recording/reproducing light RL1.

At the time of recording, the objective lens 107 is driven to focus servo light SL on the track T by an objective lens actuator (not shown) so that the focus spot of servo light SL follows the track T. At this time, recording/reproducing light RL1 is focused on a predetermined depth position in the recording layer D0 by the diffraction hologram 106. Further, the objective lens 114 is driven in association with the objective lens 107. For instance, the objective lens 114 is integrally formed with the objective lens 107, and is integrally driven with the objective lens 107. Recording/reproducing light RL2 to be entered from the objective lens 114 is focused at the same depth position in the recording layer D0 as recording/reproducing light RL1 by the diffraction hologram 113. Thus, recording/reproducing light RL1 and RL2 is focused at the same depth position, and a recording mark by interference is formed at the same depth position. By performing the above operation, a signal layer D2 is formed at a predetermined depth position in the recording layer D0.

Referring back to FIG. 11A, servo light SL reflected on the servo layer D1 is entered into the beam splitter 104 on a return path opposite to the optical path at the time of incidence, and a part of servo light SL is entered into a detection lens 115. The detection lens 115 imparts astigmatism to incident servo light SL. Servo light SL imparted with astigmatism is entered into a spectral element 116. The detection lens 115 corresponds to the astigmatism element in the aforementioned technical principle.

The spectral element 116 has a blazed diffraction pattern (diffraction hologram) on an incident surface thereof. As shown in FIG. 9A, the spectral element 116 divides incident servo light SL into four light fluxes by the diffraction pattern to thereby change the propagating directions of each light flux. The arrangement and the function of the spectral element 116 will be described later referring to FIG. 12A.

On the other hand, recording/reproducing light RL1 and RL2 irradiated onto the disc D propagates along an optical path from the beam splitter 104 to the objective lens 107, or an optical path from the beam splitter 104 to the objective lens 114, are entered into the beam splitter 104, and a part of recording/reproducing light RL1 and RL2 is directed to the detection lens 115. Recording/reproducing light RL1 and RL2 entered into the detection lens 115 is imparted with astigmatism by the detection lens 115 in the similar manner as servo light SL. Thereafter, recording/reproducing light RL1 and RL2 is diffracted by the spectral element 116, and separated into four light fluxes.

Thus, servo light SL and recording/reproducing light RL1 and RL2 separated by the spectral element 116 are received on a photodetector 117. At this time, servo light SL and recording/reproducing light RL1 and RL2 have the distributions as shown in FIG. 9B, on the light receiving surface of the photodetector 117. Since the servo layer D1 is a single layer, there is no likelihood that stray light of servo light SL may be generated. As will be described later, the diffraction angles of servo light SL, and recording/reproducing light RL1 and RL2 by the spectral element 116 are different from each other. Accordingly, the signal light area of servo light SL, and the signal light area of recording/reproducing light RL1 and RL2 are different from each other in size. In this example, the signal light area of recording/reproducing light RL1 and RL2 is larger than the signal light area of servo light SL.

As shown in FIG. 11C, the photodetector 117 has a sensor group (sensing portions P21 through P28) disposed on the irradiation position of servo light SL, and a sensor group (sensing portions P31 through P34) disposed on the irradiation position of recording/reproducing light RL1 and RL2. The sensing portions of the sensor groups are disposed on the plane S0 shown in FIG. 1A.

At the time of recording, the laser light source 101 constantly emits light, and the laser light source 102 is controlled to turn on and off in accordance with a recording signal. At this time, the shutter 110 is brought to a light transmissive state. Accordingly, the disc D is irradiated with servo light SL, and recording/reproducing light RL1 and RL2. The convergence positions of recording/reproducing light RL1 and RL2 are adjusted to a predetermined depth position by displacing the positions of the diffraction holograms 106 and 113 in the optical axis direction.

Further, at the time of reproducing, both of the laser light sources 101 and 102 constantly emit light, and the shutter 110 is brought to a light blocking state. Accordingly, the disc D is not irradiated with recording/reproducing light RL2, and is irradiated with servo light SL and recording/reproducing light RL1. At this time, the convergence position of recording/reproducing light RL1 is aligned with the position of a signal layer (target signal layer) to be reproduced by displacing the position of the diffraction hologram 106 in the optical axis direction.

At the time of recording, since the shutter 110 is brought to a light transmissive state, servo light transmitted through the beam splitter 104 is also irradiated onto the disc D. However, since this servo light is greatly defocused with respect to the servo layer D1, an influence of this servo light on signals to be outputted from each sensing portion can be eliminated, even if the servo light is reflected on the servo layer D1 and entered into the photodetector 117.

Figure 12A:
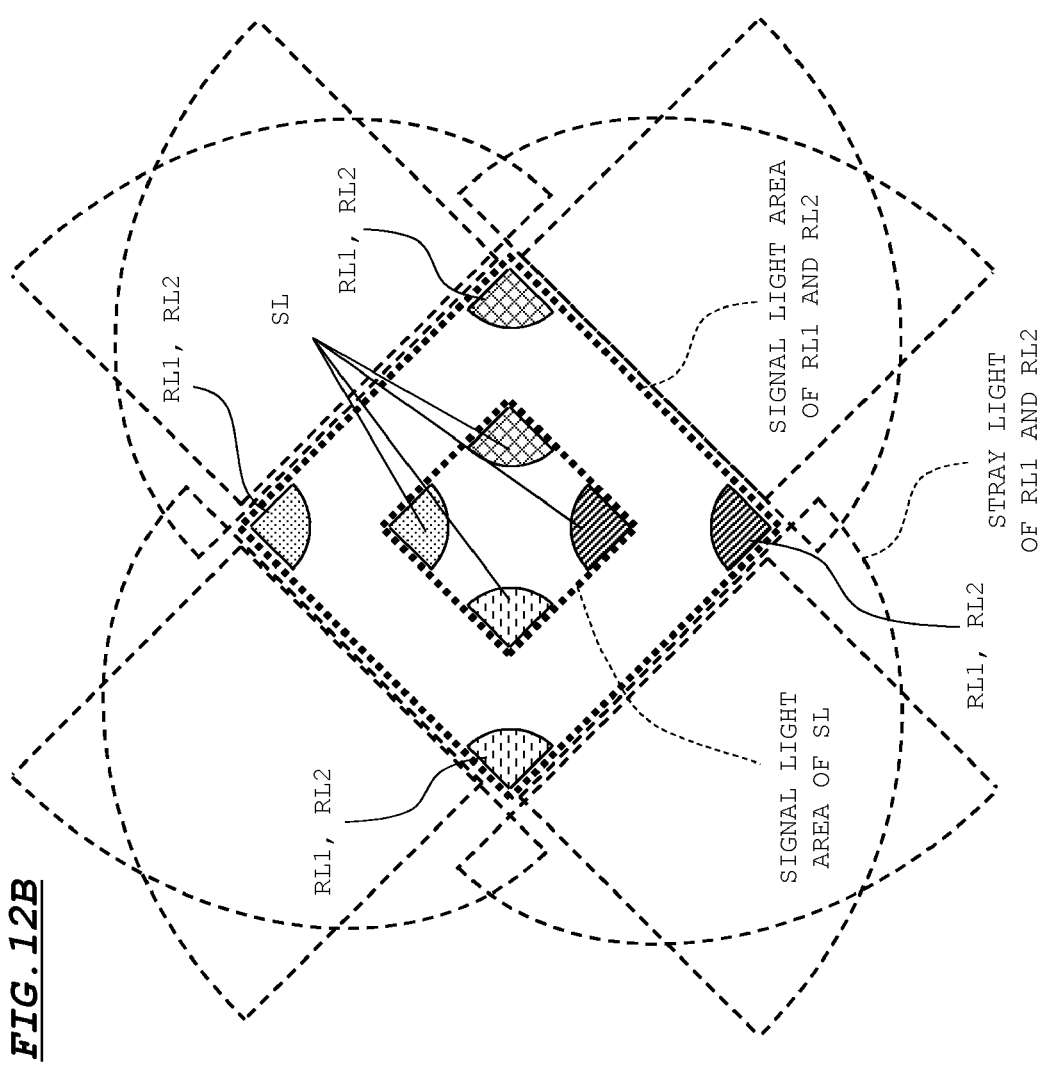
FIGS. 12A and 12B are diagrams for describing an arrangement of a spectral element in example 1.

FIG. 12A is a plan view of the spectral element 116 when viewed from the side of the detection lens 115.

The spectral element 116 is made of a square transparent plate, and has a blazed diffraction pattern (diffraction hologram) on a light incident surface thereof. As shown in FIG. 12A, the light incident surface is divided into four diffraction areas 116a through 116d. The spectral element 116 is disposed posterior to the detection lens 115 so that laser light (servo light SL, and recording/reproducing light RL1 and RL2) that has been transmitted through the light flux area A through D shown in FIG. 9A are entered into the diffraction areas 116a through 116d.

Figure 12B:
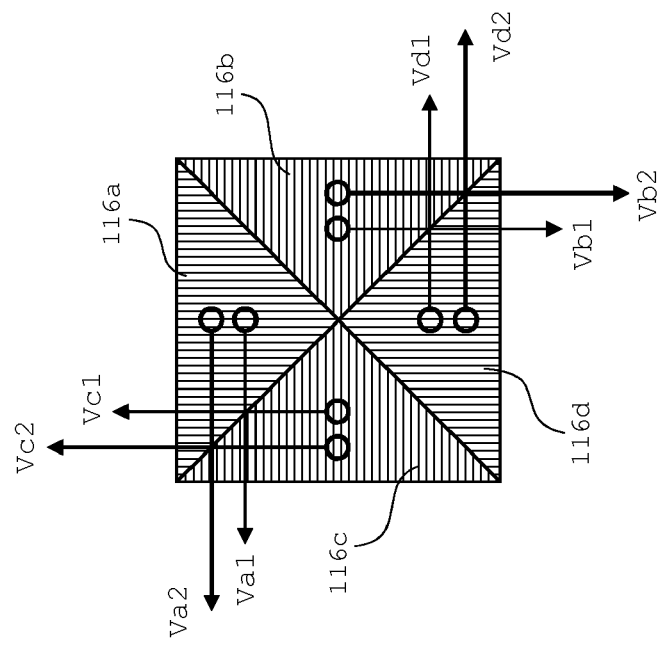

The diffraction areas 116a through 116d diffract incident servo light SL in directions Va1 through Vd1 by first order diffraction, and diffract incident recording/reproducing light RL1 and RL2 in directions Va2 through Vd2 by second order diffraction. The directions Va1 through Vd1 coincide with the directions Da through Dd shown in FIG. 9A, and the directions Va2 through Vd2 also coincide with the directions Da through Dd shown in FIG. 9A. Further, the first order diffraction angle (of servo light SL) is the same in each of the diffraction areas 116a through 116d, and the second order diffraction angle (of recording/reproducing light RL1 and RL2) is also the same in each of the diffraction areas 116a through 116d. The second order diffraction angle of recording/reproducing light RL1 and RL2 is larger than the first order diffraction angle of servo light SL. With this arrangement, servo light SL, and recording/reproducing light RL1 and RL2 have the distributions as shown in FIG. 12B, on the light receiving surface of the photodetector 117.

The diffraction pattern of the diffraction areas 116a through 116d is formed in such a manner that the diffraction efficiency of first order diffraction with respect to the wavelength (660 nm) of servo light SL is set high, and that the diffraction efficiency of second order diffraction with respect to the wavelength (405 nm) of recording/reproducing light RL1 and RL2 is set high. In the blazed diffraction pattern, the diffraction efficiency is adjusted by the blaze height of a hologram pattern, and the diffraction angle is adjusted by the pitch of a diffraction pattern.

Figure 13:
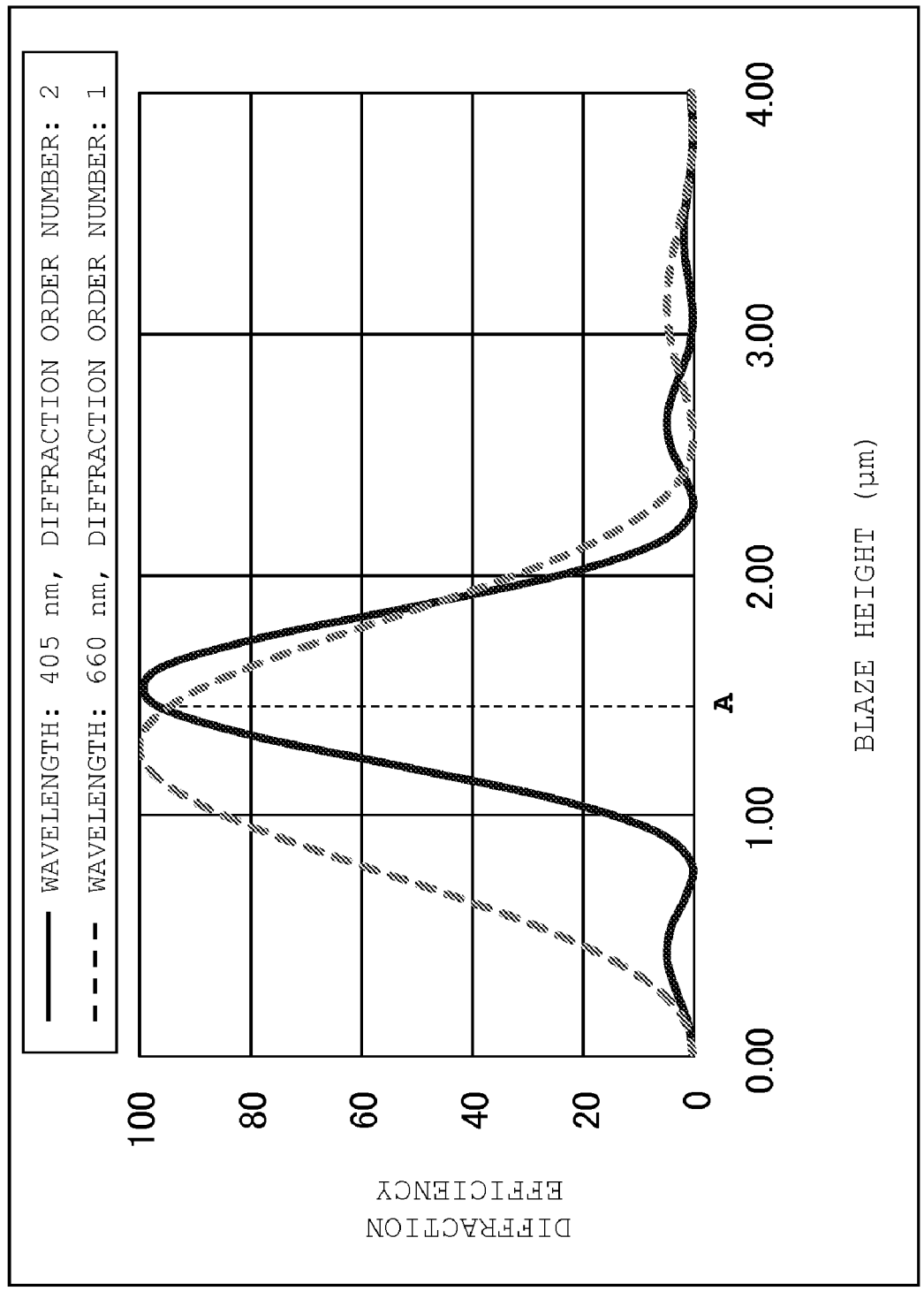
FIG. 13 is a diagram for describing a characteristic of a spectral element in example 1.

FIG. 13 shows a simulation example of a relation between a blaze height and a diffraction efficiency. In this case, the diffraction pattern of the diffraction areas 116a through 116d is formed in such a manner that the blaze height becomes the value of the height A shown in FIG. 13. With this arrangement, it is possible to secure 90% or more of both of the diffraction efficiency of first order diffraction with respect to the wavelength (660 nm) of servo light SL, and the diffraction efficiency of second order diffraction with respect to the wavelength (405 nm) of recording/reproducing light RL1 and RL2.

The diffraction angle is proportional to a value obtained by multiplying a diffraction order number with a wavelength. In this example, the diffraction angle of servo light SL becomes a value of diffraction order number×wavelength=660 degrees, and the diffraction angle of recording/reproducing light RL1 and RL2 becomes a value of diffraction order number×wavelength=910 degrees. Thus, the diffraction angle of recording/reproducing light RL1 and RL2 is about 1.5 times of the diffraction angle of servo light SL. With this arrangement, as shown in FIG. 12B, the signal light area of servo light SL is positioned at an inner side of the signal light area of recording/reproducing light RL1 and RL2.

In this example, the sensing portions P21 through P28 shown in FIG. 11C are disposed at corner portions of the signal light area of servo light SL, and the sensing portions P31 through P34 shown in FIG. 11C are disposed at corner portions of the signal light area of recording/reproducing light RL1 and RL2. With this arrangement, it is possible to receive only signal light of servo light SL, and receive only signal light of recording/reproducing light RL1 and RL2 by the respective sensing portions.

At the time of recording, if there is a recorded signal layer in the recording layer D0, other than a signal layer being recorded, recording/reproducing light RL1 and RL2 reflected on the recorded signal light may become stray light, and be entered into the photodetector 117. Further, at the time of reproducing, recording/reproducing light RL1 reflected on a signal layer other than a target signal layer to be reproduced may become stray light, and be entered into the photodetector 117. In these cases, as described in the above technical principle, stray light of recording/reproducing light RL1 and RL2 has a distribution in the periphery of the signal light area of recording/reproducing light RL1 and RL2, on the light receiving surface of the photodetector 117 (see FIG. 12B).

As described above, the sensing portions P21 through P28 are disposed at the corner portions of the signal light area of servo light SL as shown in FIG. 12B, and the sensing portions P31 through P34 are disposed at the corner portions of the signal light area of recording/reproducing light RL1 and RL2 as shown in FIG. 12B. Accordingly, there is no likelihood that stray light of recording/reproducing light RL1 and RL2 may be entered into the sensing portions P21 through P28, and into the sensing potions P31 through P34.

Since servo light SL is reflected only on the servo layer D1, there is no likelihood that stray light of servo light SL may be generated. Accordingly, servo light SL reflected on the servo layer D1 has a distribution only within the signal light area of servo light SL shown in FIG. 12B, without likelihood that stray light of servo light SL may have a distribution in the periphery of the signal light area of servo light SL shown in FIG. 12B. Thus, there is no likelihood that stray light of servo light SL may be entered into the sensing portions P31 through P34 for recording/reproducing light.

As described above, in this example, it is possible to avoid incidence of unwanted stray light from the disc D into the sensing portions of each sensor group shown in FIG. 11C. Further, simultaneously, it is possible to separate and receive servo light and recording/reproducing light on the same light receiving surface. Further, these advantages can be realized by a simplified arrangement of disposing the spectral element 116 between the detection lens 115 and the photodetector 117. In other words, this example is advantageous in separating and receiving recording/reproducing light and servo light reflected on the disc D, and preventing incidence of stray light into the photodetector for receiving recording/reproducing light and servo light, with a simplified arrangement.

Furthermore, in this example, since the spectral element 116 is configured to guide servo light SL and recording/reproducing light RL1 and RL2 to four different vertex positions of a square, on the light receiving surface of the photodetector 117, it is possible to make the signal light area of servo light SL and the signal light area of recording/reproducing right RL1 and RL2 compact, and to make the disposition area of the sensing portions for servo light SL and the disposition area of the sensing portions for recording/reproducing light RL1 and RL2 compact.

In this example, a focus error signal and a push-pull signal (tracking error signal) are generated by computing signals to be outputted from the sensing portions P21 through P28 by the method described referring to FIGS. 10A through 10D. Signals to be outputted from the sensing portions P31 through P34 are not used to generate a focus error signal and a push-pull signal, but are used only for summation to generate a reproduction RF signal. Accordingly, there is no need of configuring the sensing portions P31 through P34 to receive one light flux by each two sensing portions, unlike the sensing portions P21 through P28; and the sensing portions P31 through P34 may be configured to receive one light flux by each one sensing portion.

Example 2

This example is an example, wherein the invention is applied to an optical pickup device compatible with a recording medium using the aforementioned two photon absorption method. In this example, a disc is used as a recording medium, as well as example 1.

FIG. 14A shows an optical system of an optical pickup device in this example. A laser light source 201 emits laser light (hereinafter, called as "servo light SL" in this example) having a wavelength of about 405 nm. A laser light source 202 emits laser light (hereinafter, called as "recording/reproducing light RL" in this example) having a wavelength of about 405 nm. A dichroic prism 203 transmits servo light SL emitted from the laser light source 201, and reflects recording/reproducing light RL emitted from the laser light source 202. Servo light SL and recording/reproducing light RL have optical axes thereof aligned by the dichroic prism 203.

The reference numeral 204 denotes a polarized beam splitter. Servo light SL and recording/reproducing light RL that have been entered from the side of the dichroic prism 203 into the polarized beam splitter 204 is reflected on the polarized beam splitter 204.

Servo light SL and recording/reproducing light RL reflected on the polarized beam splitter 204 are converted into parallel light by a collimator lens 205, and then entered into a diffraction hologram 206.

The diffraction hologram 206 acts only on light having the wavelength band of recording/reproducing light RL, out of servo light SL and recording/reproducing light RL. The diffraction hologram 206 has a function of diverging recording/reproducing light RL by a predetermined angle, and a function of limiting the aperture. Further, the diffraction hologram 206 is supported to be displaceable in the optical axis direction in accordance with a drive signal by an actuator 206a. The focus position of recording/reproducing light RL by an objective lens 208 is adjustable in the depth direction by displacing the diffraction hologram 206 in the optical axis direction. Servo light SL and recording/reproducing light RL transmitted through the diffraction hologram 206 are converted into circularly polarized light by a quarter wavelength plate 207, and then converged on a disc D by the objective lens 208.

FIG. 14B is a diagram showing an irradiation state of servo light SL and recording/reproducing light RL with respect to the disc D. The disc D is provided with a recording layer D0 and a servo layer D1. The servo layer D1 is disposed on a surface of the recording layer D0 on the side of the objective lens 208. Further, a track T is formed on the servo layer D1 in a spiral form from an inner periphery toward an outer periphery of the disc D. The servo layer D1 is made of a material having a high reflectance with respect to servo light SL, but having a low reflectance with respect to recording/reproducing light RL.

At the time of recording/reproducing, the objective lens 208 is driven to focus servo light SL on the track T by an objective lens actuator (not shown) so that the focus spot of servo light SL follows the track T. At this time, recording/reproducing light RL is focused on a predetermined depth position in the recording layer D0 by the diffraction hologram 206.

Specifically, at the time of recording, the laser light source 201 constantly emits light, and the objective lens 208 is controlled. At this time, the convergence position of recording/reproducing light RL is adjusted to a predetermined depth position by displacing the position of the diffraction holograms 206 in the optical axis direction. In this state, the laser light source 202 is controlled to emit light with a short pulse and at a high output in accordance with a recording signal. With this arrangement, two photon absorption occurs at the convergence position of recording/reproducing light RL, and a recording mark is formed thereat. Thus, a signal layer D2 is formed in the recording layer D0.

Further, at the time of reproducing, the laser light source 201 constantly emits light, and the laser light source 202 emits light with such an intensity that two photon absorption does not occur. At this time, the convergence position of recording/reproducing light RL is aligned with the position of a signal layer (target signal light) to be reproduced by displacing the position of the diffraction hologram 206 in the optical axis direction.

Referring back to FIG. 14A, servo light SL reflected on the servo layer D1 is entered into the polarized beam splitter 204 on a return path opposite to the optical path at the time of incidence. In this state, servo light SL becomes P-polarized light with respect to the polarized beam splitter 204 by passing the quarter wavelength plate 207 again. Thus, servo light SL is transmitted through the polarized beam splitter 204, and is entered into the detection lens 209. The detection lens 209 imparts astigmatism to incident servo light SL. Servo light SL imparted with astigmatism is entered into a spectral element 210. The detection lens 209 corresponds to the astigmatism element in the aforementioned technical principle.

The spectral element 210 has a blazed diffraction pattern (diffraction hologram) on an incident surface thereof. As shown in FIG. 9A, the spectral element 210 divides incident servo light SL into four light fluxes by the diffraction pattern to thereby change the propagating directions of each light flux. The arrangement and the function of the spectral element 210 are substantially the same as those of the spectral element 116 described referring to FIG. 12A, except that the spectral element 210 in this example is different from the spectral element 116 shown in FIG. 12A in the diffraction order number and the diffraction efficiency. The difference will be described later referring to FIG. 15A.

Recording/reproducing light RL reflected on the signal layer in the disc D is entered into the polarized beam splitter 204 along the return path opposite to the optical path at the time of incidence. At this time, recording/reproducing light RL becomes P-polarized light with respect to the polarized beam splitter 204 by passing the quarter wavelength plate 207 again. Thus, recording/reproducing light RL is transmitted through the polarized beam splitter 204, and is entered into the detection lens 209. The detection lens 209 imparts astigmatism to incident recording/reproducing light RL. Thereafter, recording/reproducing light RL is diffracted by the spectral element 210, and separated into four light fluxes.

Thus, servo light SL and recording/reproducing light RL separated by the spectral element 210 are received on a photodetector 211. At this time, servo light SL and recording/reproducing light RL have the distributions as shown in FIG. 9B, on the light receiving surface of the photodetector 211. Since the servo layer D1 is a single layer, there is no likelihood that stray light of servo light SL may be generated. As will be described later, the diffraction angles of servo light SL and recording/reproducing light RL by the spectral element 210 are different from each other. As a result, the signal light area of servo light SL and the signal light area of recording/reproducing light RL are different from each other in size. In this example, similarly to example 1, the signal light area of recording/reproducing light RL is set larger than the signal light area of servo light SL.

As shown in FIG. 14C, similarly to the photodetector 117 in example 1, the photodetector 211 has sensing portions P21 through P28 disposed on the irradiation position of servo light SL, and sensing portions P31 through P34 disposed on the irradiation position of recording/reproducing light RL. The sensing portions are disposed on the plane S0 shown in FIG. 1A.

Figure 15A:
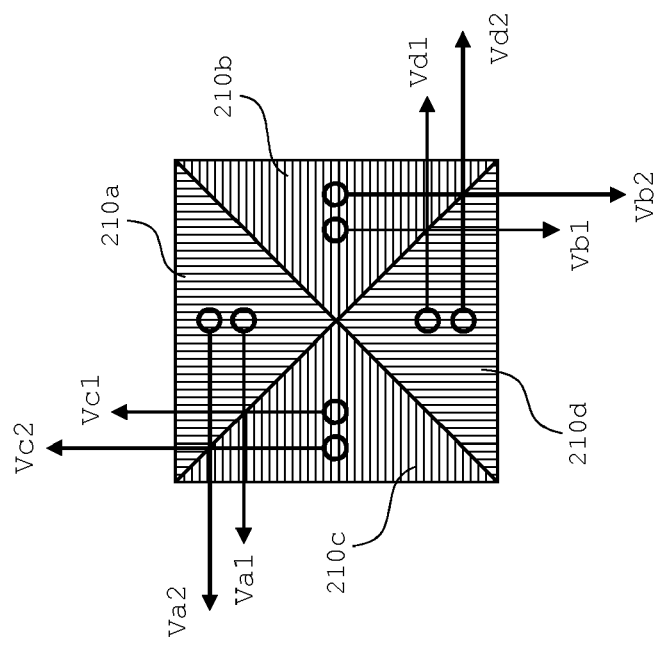
FIGS. 15A and 15B are diagrams for describing an arrangement of a spectral element in example 2.

Next, the arrangement and the characteristic of the spectral element 210 are described referring to FIG. 15A. FIG. 15A is a diagram of the spectral element 210 when viewed from the side of the detection lens 209.

Similarly to the spectral element 116 in example 1, the spectral element 210 is made of a square transparent plate, and has a blazed diffraction pattern (diffraction hologram) on a light incident surface thereof. Similarly to the arrangement shown in FIG. 12A, the light incident surface is divided into four diffraction areas 210a through 210d. The spectral element 210 is disposed posterior to the detection lens 209 so that laser light (servo light SL, and recording/reproducing light RL) that has been transmitted through the light flux area A through D shown in FIG. 9A are respectively entered into the diffraction areas 210a through 210d.

Figure 15B:
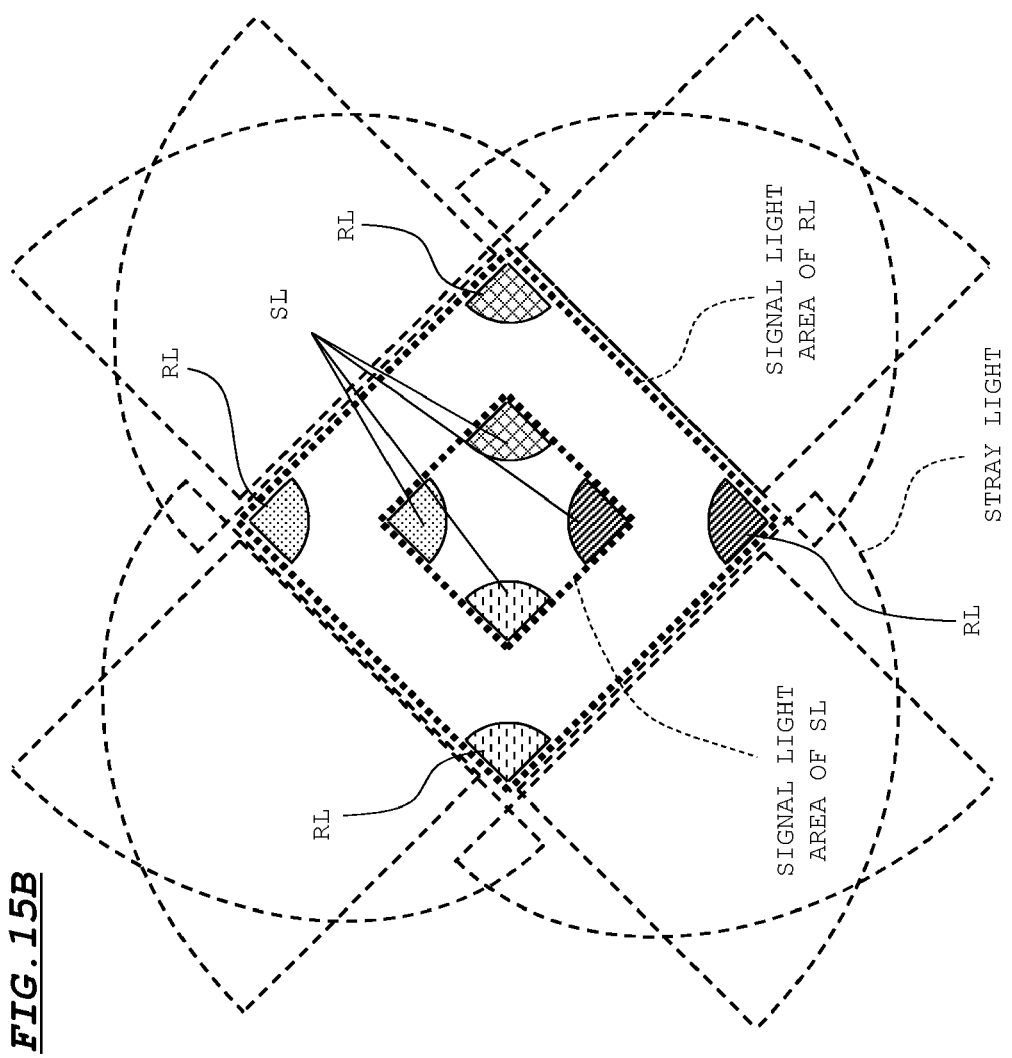

The diffraction areas 210a through 210d diffract incident servo light SL in directions Va1 through Vd1 by first order diffraction, and diffract incident recording/reproducing light RL in directions Va2 through Vd2 by first order diffraction. The directions Va1 through Vd1 coincide with the directions Da through Dd shown in FIG. 9A, and the directions Va2 through Vd2 also coincide with the directions Da through Dd shown in FIG. 9A. The diffraction angle of recording/reproducing light RL is set larger than the diffraction angle of servo light SL. With this arrangement, servo light SL and recording/reproducing light RL have the distributions as shown in FIG. 15B, on the light receiving surface of the photodetector 211.

The diffraction pattern of the diffraction areas 210a through 210d is formed in such a manner that the diffraction efficiency of first order diffraction with respect to the wavelength (405 nm) of servo light SL is set high, and that the diffraction efficiency of first order diffraction with respect to the wavelength (660 nm) of recording/reproducing light RL is set high. In the blazed diffraction pattern, the diffraction efficiency is adjusted by the blaze height of a hologram pattern, and the diffraction angle is adjusted by the pitch of a hologram pattern.

Figure 16:
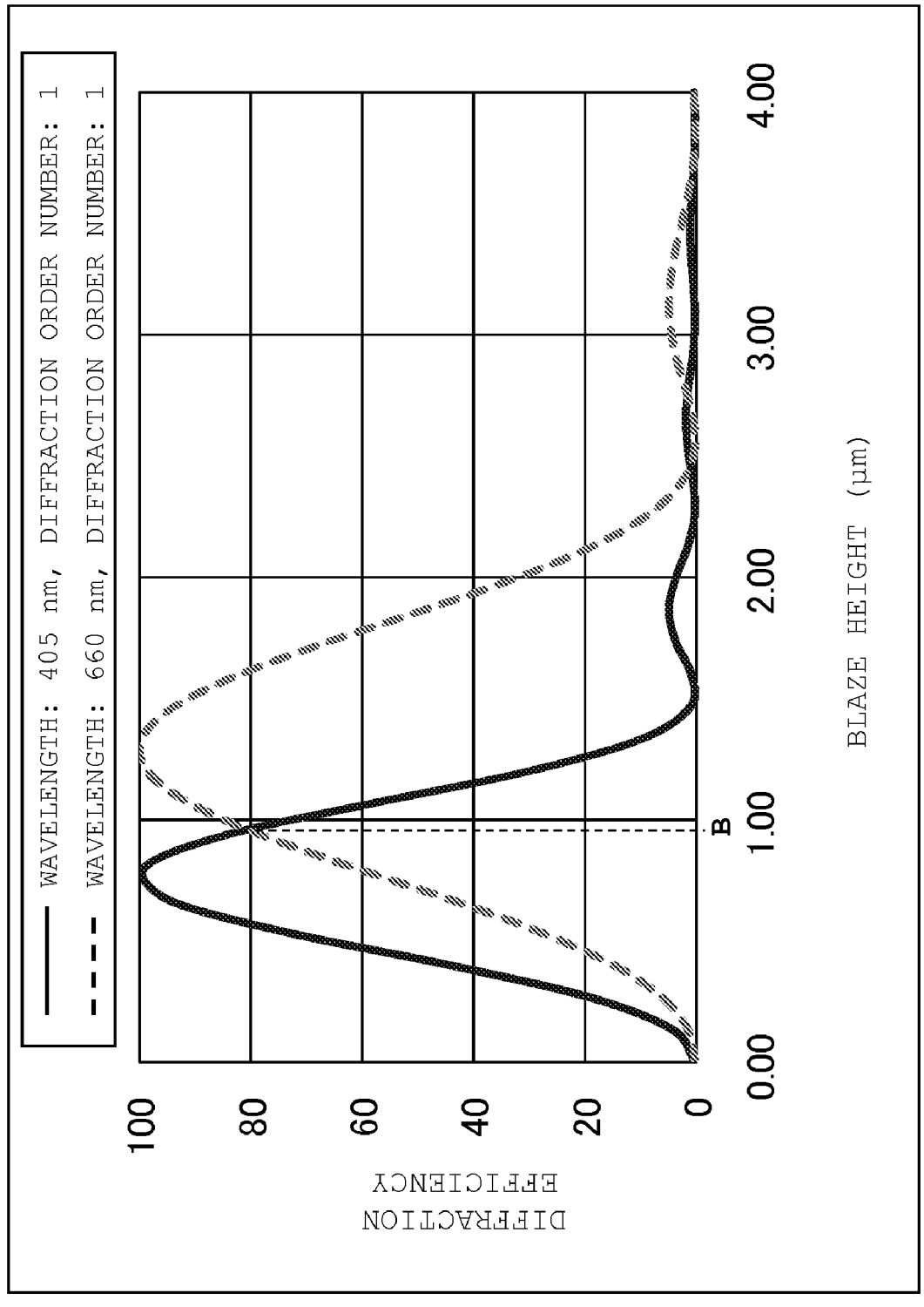
FIG. 16 is a diagram for describing a characteristic of a spectral element in example 2.

FIG. 16 shows a simulation example of a relation between a blaze height and a diffraction efficiency. In this case, the diffraction pattern of the diffraction areas 210a through 210d is formed in such a manner that the blaze height becomes the value of the height B shown in FIG. 16. With this arrangement, it is possible to secure 80% or more of both of the diffraction efficiency of first order diffraction with respect to the wavelength (405 nm) of servo light SL, and the diffraction efficiency of first order diffraction with respect to the wavelength (660 nm) of recording/reproducing light RL.

As described in example 1, the diffraction angle is proportional to a value obtained by multiplying a diffraction order number with a wavelength. In this example, the diffraction angle of servo light SL becomes a value of diffraction order number×wavelength=405 degrees, and the diffraction angle of recording/reproducing light RL becomes a value of diffraction order number×wavelength=660 degrees. Thus, the diffraction angle of recording/reproducing light RL is about 1.5 times of the diffraction angle of servo light SL. With this arrangement, as shown in FIG. 15B, the signal light area of servo light SL is positioned at an inner side of the signal light area of recording/reproducing light RL.

In this example, the sensing portions P21 through P28 shown in FIG. 14C are disposed at corner portions of the signal light area of servo light SL, and the sensing portions P31 through P34 shown in FIG. 14C are disposed at corner portions of the signal light area of recording/reproducing light RL. With this arrangement, it is possible to receive only signal light of servo light SL, and receive only signal light of recording/reproducing light RL by the respective sensing portions in the similar manner as example 1.

As described above, in this example, it is possible to avoid incidence of unwanted stray light from the disc D into the sensing portion of each sensor group shown in FIG. 14C.

Further, simultaneously, it is possible to separate and receive servo light and recording/reproducing light on the same light receiving surface. Further, these advantages can be realized by a simplified arrangement of disposing the spectral element 210 between the detection lens 209 and the photodetector 211. In other words, this example is advantageous in separating and receiving recording/reproducing light and servo light reflected on the disc D, and preventing incidence of stray light into the photodetector for receiving recording/reproducing light and servo light, with a simplified arrangement.

Furthermore, in this example, since the spectral element 210 is configured to guide servo light SL and recording/reproducing light RL to four different vertex positions of a square, on the light receiving surface of the photodetector 211, it is possible to make the signal light area of servo light SL and the signal light area of recording/reproducing right RL compact, and to make the disposition area of the sensor group for servo light SL, and the disposition area of the sensor group for recording/reproducing light RL compact.

In this example, similarly to example 1, a focus error signal and a push-pull signal (tracking error signal) can be generated by computing signals to be outputted from the sensing portions P21 through P28 by the method described referring to FIGS. 10A through 10D.

Figure 17:
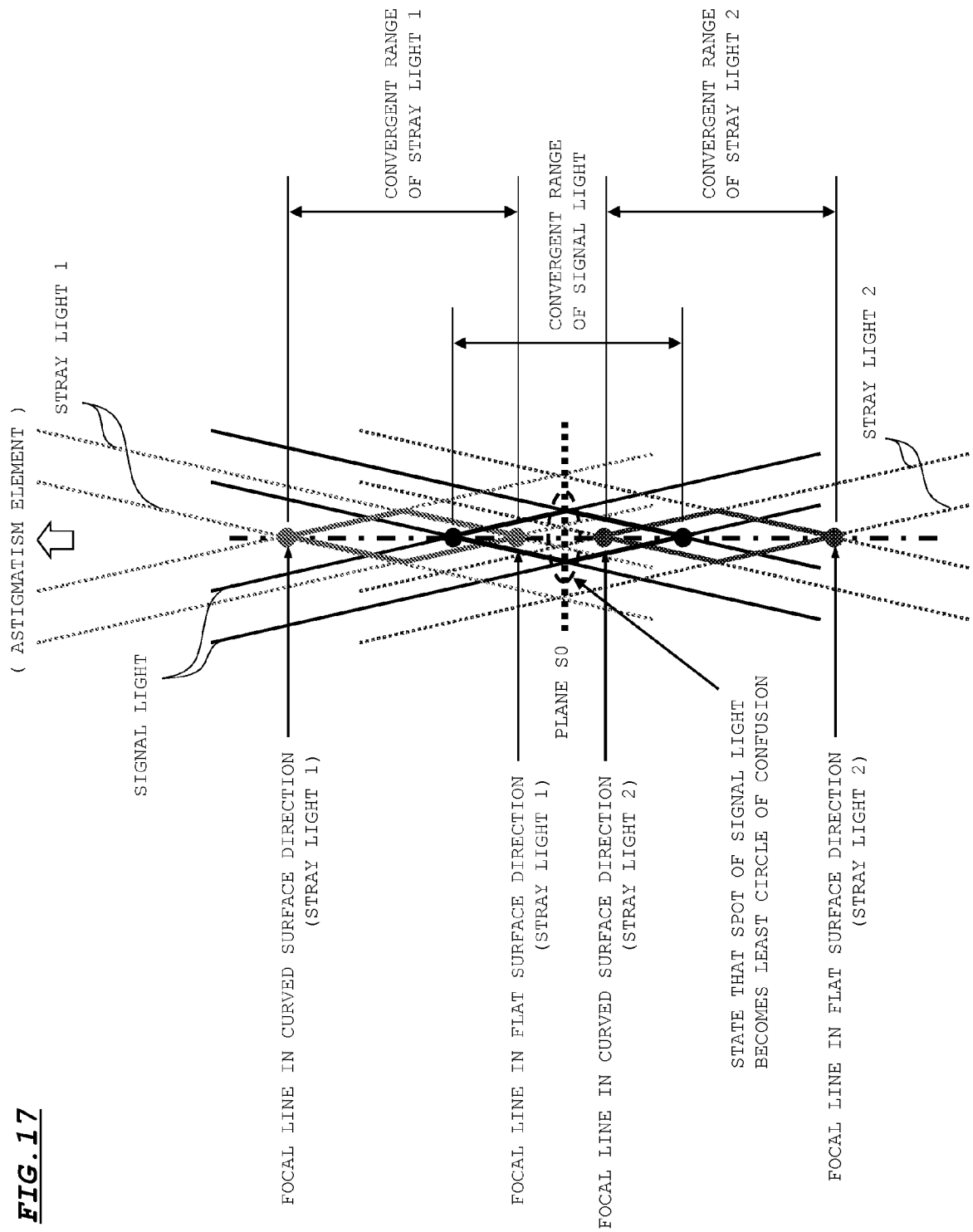
FIG. 17 is a diagram showing a preferable range of the technical principle to be applied to the inventive examples and the invention.

Two examples based on the above principle have been described as above. The advantage based on the above principle can be obtained, as shown in FIG. 17, in the case where the focal line position of stray light 1 in the flat surface direction is close to the astigmatism element with respect to the plane S0 (surface where the spot of signal light becomes a least circle of confusion), and the focal line position of stray light 2 in the curved surface direction is away from the astigmatism element with respect to the plane S0. Specifically, as far as the above relation is satisfied, the distribution state of signal light and stray light 1 and 2 is as shown in FIGS. 8A through 8D, which makes it possible to prevent signal light and stray light 1 and 2 from superimposing with each other on the plane S0. In other words, as far as the above relation is satisfied, the advantage of the invention and the inventive examples based on the above principle can be obtained, even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

Modification Examples

In this section, modification examples of examples 1 and 2 are described.

Figure 18B:
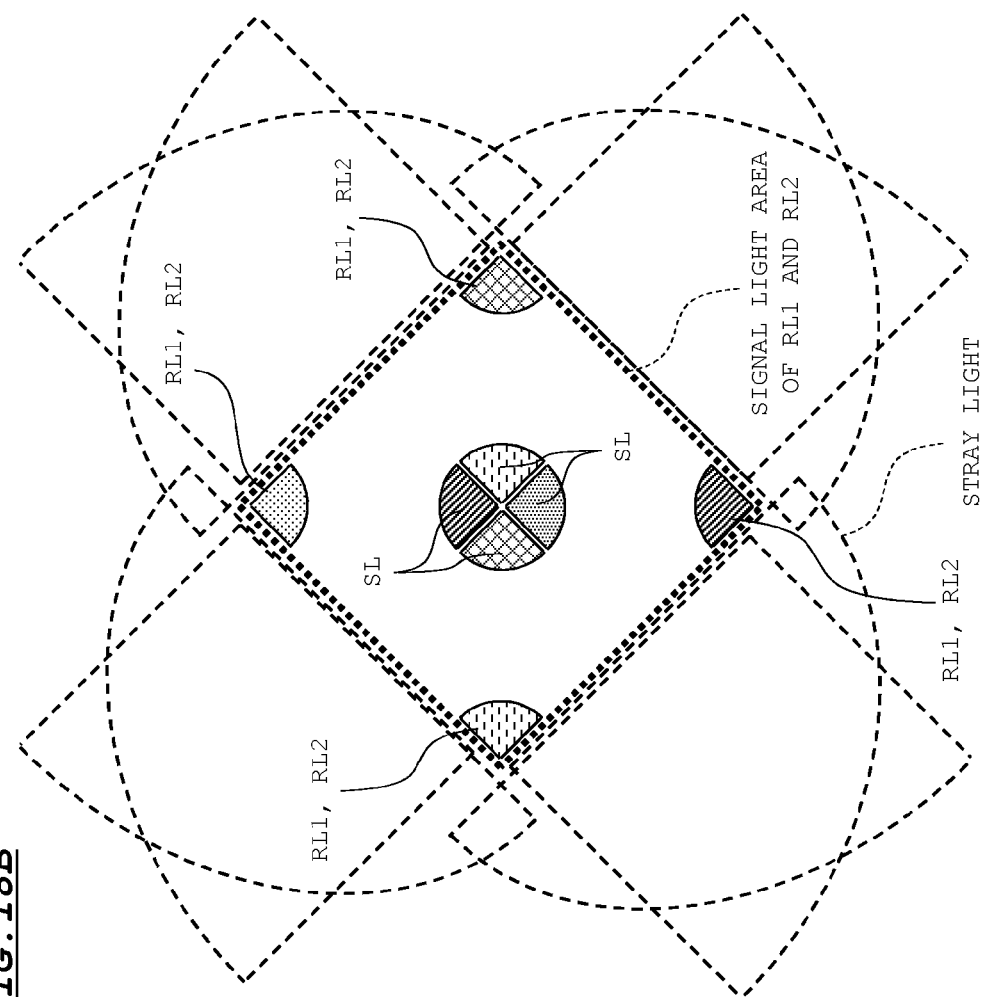
FIGS. 18A through 18C are diagrams showing an arrangement of a spectral element and a sensor layout in a modification example.
Figure 18A:
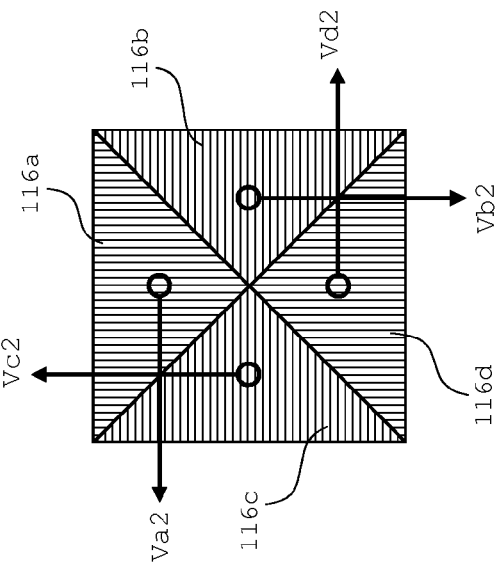
Figure 18C:
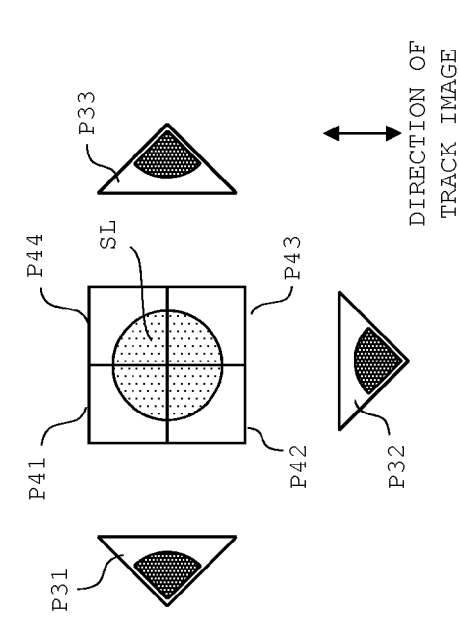

FIGS. 18A through 18C are diagrams showing an arrangement of modification example 1. In this modification example, the function of the spectral element 116 in example 1 is modified, and the sensor layout on the photodetector 117 is modified in accordance with the modification of the spectral element. This modification example is also applicable to example 2.

FIG. 18A is a diagram of a spectral element 116 when viewed from the side of a detection lens 115. Similarly to example 1, the spectral element 116 is made of a square transparent plate except that in this modification example, a stepped diffraction pattern (diffraction hologram) is formed on a light incident surface of the spectral element 116, in place of a blazed diffraction pattern. Similarly to FIG. 12A, the light incident surface is divided into four diffraction areas 116a through 116d. The spectral element 116 is disposed posterior to the detection lens 115 so that laser light (servo light SL, and recording/reproducing light RL1 and RL2) that has been transmitted through the light flux area A through D shown in FIG. 9A are respectively entered into the diffraction areas 116a through 116d.

The diffraction areas 116a through 116d diffract incident recording/reproducing light RL1 and RL2 in directions Va2 through Vd2 by first order diffraction, and propagate incident servo light SL substantially straight without diffraction. The directions Va2 through Vd2 coincide with the directions Da through Dd shown in FIG. 9A. With this arrangement, servo light SL, and recording/reproducing light RL1 and RL2 have the distributions as shown in FIG. 18B, on the light receiving surface of the photodetector 117.

The diffraction pattern of the diffraction areas 116a through 116d is formed in such a manner that the diffraction efficiency of zero-th order diffraction with respect to the wavelength (660 nm) of servo light SL is set high, and that the diffraction efficiency of first order diffraction with respect to the wavelength (405 nm) of recording/reproducing light RL1 and RL2 is set high. In the stepped diffraction pattern (diffraction hologram), the diffraction efficiency is adjusted by the number of steps and the height per step of a diffraction hologram, and the diffraction angle is adjusted by the pitch of a diffraction hologram. In this modification example, for instance, a four-stepped diffraction hologram is used.

The sensor layout of the photodetector 117 is modified as shown in FIG. 18C in accordance with the distributions of recording/reproducing light RL1 and RL2, and servo light SL shown in FIG. 18B. Specifically, sensing portions P41 through P44 (four-division sensor) for receiving servo light SL is disposed at an irradiation position of servo light SL. The sensing portions P41 through P44 (four-division sensor) is disposed at such a position that an intersection of parting lines is aligned with the optical axis of servo light SL. The disposition of sensing portions P31 through P34 is the same as in example 1.

In this modification example, it is possible to generate a focus error signal and a push-pull signal (tracking error signal) by computing signals to be outputted from the sensing portions P41 through P44 (four-division sensor) in accordance with the conventional astigmatism method and one-beam push-pull method.

In this modification example, it is also possible to avoid incidence of unwanted stray light from the disc D into the sensing portions of the sensor group shown in FIG. 18C. Further, simultaneously, it is possible to separate and receive servo light and recording/reproducing light on the same light receiving surface. Further, these advantages can be realized by a simplified arrangement of disposing the spectral element 116 between the detection lens 115 and the photodetector 117. In other words, this modification example is advantageous in separating and receiving recording/reproducing light and servo light reflected on the disc D, and preventing incidence of stray light into the photodetector for receiving recording/reproducing light and servo light, with a simplified arrangement.

Figure 19A:
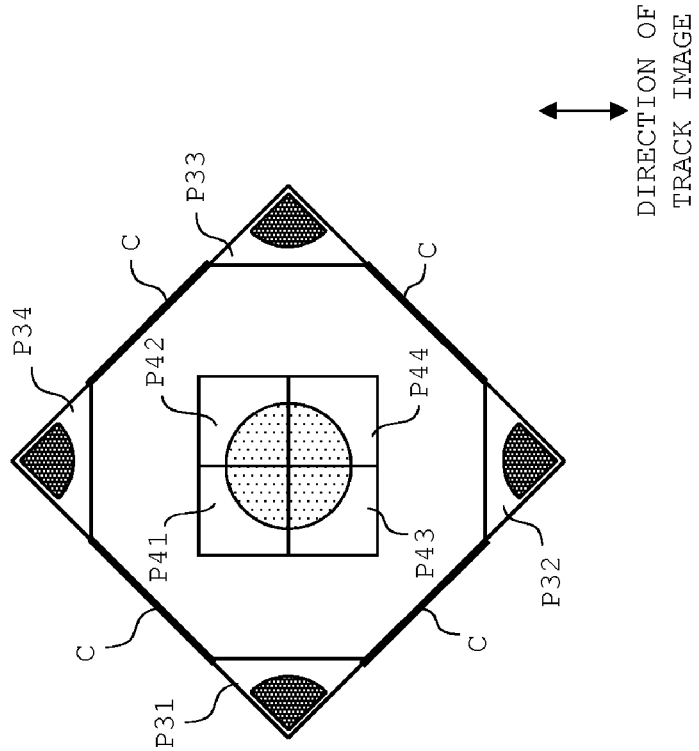
FIGS. 19A and 19B are diagrams showing a sensor layout in another modification example.
Figure 19B:
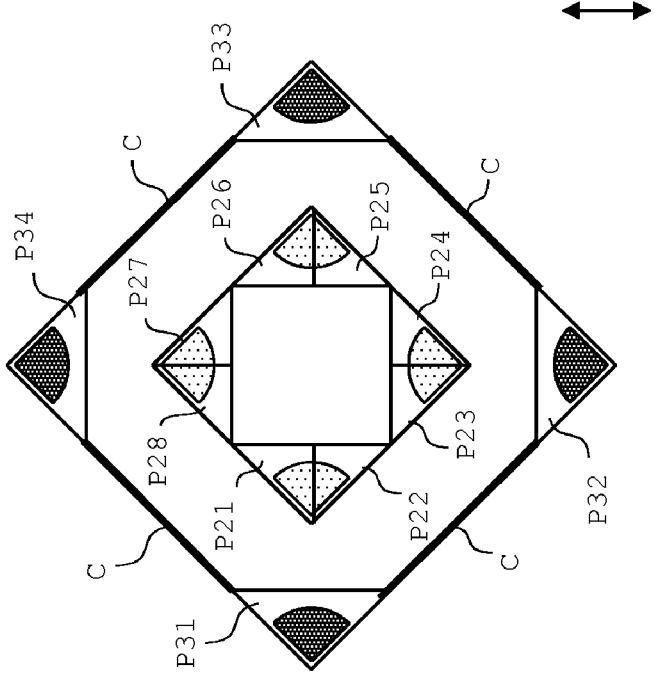

FIGS. 19A and 19B are diagrams showing an arrangement of modification example 2. In this modification example, the arrangement of the photodetector 117 in example 1 and the arrangement of the photodetector 211 in example 2, and the arrangement of the photodetector 117 in modification example 1 are modified.

In FIG. 19A, the arrangements of the sensing portions of the photodetector 117 in example 1 and the photodetector 211 in example 2 are modified. Specifically, in this modification example, sensing portions P31 through P34 are short-circuited by connectors C.

In FIG. 19B, the arrangement of the sensing portions of the photodetector 117 in modification example 1 is modified. Specifically, in this modification example, sensing portions P31 through P34 are short-circuited by connectors C.

The sensing portions P31 through P34 are adapted to generate a reproduction RF signal, and the reproduction RF signal is generated by summing up signals from each sensing portion. Short-circuiting the sensing portions P31 through P34 as shown in FIGS. 19A and 19B enables to obtain a reproduction RF signal by extracting a signal from either one of the sensing portions P31 through P34. This eliminates the need of an adder for summing up signals from each sensing portion. Further, the above arrangement is advantageous in reducing noise resulting from I/V conversion, as compared with a case where signals from the sensing portions are individually subjected to I/V conversion, and summed up by an adder.

The embodiment of the invention may be modified in various ways other than the above modification examples.

For instance, in examples 1 and 2, and modification examples 1 and 2, a laser light source for servo light and a laser light source for recording/reproducing light are individually disposed, and laser light emitted from the each laser light source is combined by a dichroic prism. Alternatively, a laser element for servo light and a laser element for recording/reproducing light may be disposed in one CAN, and servo light and recording/reproducing light may be emitted with a small gap in one direction. In the modification, it is preferable to align the optical axes of servo light and recording/reproducing light emitted from each laser element by a diffraction grating or a like element.

Further, in examples 1 and 2, and modification examples 1 and 2, there has been described an optical pickup device for use in both of recording and reproducing. Alternatively, the invention may be applied to an optical pickup device used only for reproduction. In the modification, for instance, the arrangement of the collimator lens 108 through the objective lens 114 is omitted from the arrangement shown in FIG. 11A.

Further, in examples 1 and 2, and modification examples 1 and 2, the diffraction holograms 106, 113, and 206 are displaced in the optical axis direction to thereby change the focus position of recording/reproducing light in the optical axis direction. Alternatively, the focus position of recording/reproducing light may be changed in the optical axis direction by using other means such as a liquid crystal lens.

Furthermore, in example 1, the non-polarized beam splitter 104 is used. Alternatively, a polarized beam splitter may be used in place of the non-polarized beam splitter. In the modification, a quarter wavelength plate is disposed in each between the diffraction hologram 106 and the objective lens 107, and between the diffraction hologram 113 and the objective lens 114. These two quarter wavelength plates are adjusted in such a manner that recording/reproducing light RL1 and RL2 that has been converted into circularly polarized light by the quarter wavelength plates interferes with each other in the recording layer D0.

Furthermore, in examples 1 and 2, and modification examples 1 and 2, the spectral elements 116 and 210 are respectively disposed posterior to the detection lenses 115 and 209. Alternatively, the spectral elements 116 and 210 may respectively be disposed anterior to the detection lenses 115 and 209.

In addition, the recording medium is not limited to a disc, but may be other medium such as an optical card. The invention may also be applied to an optical pickup device compatible with other medium such as an optical card.

The embodiment of the invention may be changed or modified in various ways as necessary, as far as such changes and modifications do not depart from the scope of the claims of the invention hereinafter defined.

What is claimed is:

1. An optical pickup device for irradiating a recording medium having laminated recording layers and servo layers with laser light, the optical pickup device comprising:
    a first laser light source for emitting first laser light having a first wavelength;
    a second laser light source for emitting second laser light having a second wavelength different from the first wavelength;
    an objective lens for converting the first laser light emitted from the first laser light source, and the second laser light emitted from the second laser light source on the recording medium;
    a focus position adjuster for changing a focus position of the first laser light by the objective lens in an optical axis direction,
    an astigmatism element for imparting astigmatism to the first laser light and the second laser light reflected on the recording medium;
    a spectral element for imparting diffraction in such a manner that at least four light fluxes of the first laser light are separated from each other, when a light flux of the first laser light and a light flux of the second laser light reflected on the recording medium are divided into four by a first straight line in parallel to a converging direction by the astigmatism element, and a second straight line perpendicular to the first straight line, and that the four light fluxes of the first laser light propagate on an outer side than the light flux of the second laser light; and
    a photodetector including a first sensor group for receiving the separated four light fluxes of the first laser light to generate a reproduction signal, and a second sensor group for receiving the second laser light to generate a servo signal for use in controlling the objective lens.

2. The optical pickup device according to claim 1, wherein
    the spectral element imparts diffraction in such a manner that four light fluxes of the second laser light obtained by dividing the light flux of the second laser light by the first straight line and the second straight line are separated from each other, and that the four light fluxes of the second laser light propagate on an inner side than the light fluxes of the first laser light, and
    the second sensor group receives each light flux of the second laser light separated by the spectral element.

3. The optical pickup device according to claim 1, wherein
    the spectral element transmits a part of the light flux of the second laser light without diffraction, and
    the second sensor group receives the light flux of the second laser light transmitted through the spectral element without diffraction.

4. The optical pickup device according to claim 1, wherein
    the spectral element is configured to guide each light flux after the separation to four different vertex positions of a square on a light receiving surface of the photodetector.

5. The optical pickup device according to claim 1, wherein
    sensing portions constituting the first sensor group and for receiving the four light fluxes are electrically connected to each other.

6. The optical pickup device according to claim 1, further comprising
    an optical system which irradiates the recording medium with the first laser light in a direction opposite to an incident direction from the objective lens.

* * * * *